United States Patent [19]

Takahara et al.

[11] Patent Number: 5,412,400

[45] Date of Patent: May 2, 1995

[54] PROCESS MONITORING SYSTEM AND A WINDOW DISPLAYING METHOD THEREFOR

[75] Inventors: Kazuko Takahara; Kazuhiko Ishii; Hideyuki Sato, all of Hitachi, Japan

[73] Assignee: Hitachi, Ltd., Tokyo, Japan

[21] Appl. No.: 796,347

[22] Filed: Nov. 22, 1991

[30] Foreign Application Priority Data

Nov. 24, 1990 [JP] Japan .................. 2-320376
Dec. 29, 1990 [JP] Japan .................. 2-416570

[51] Int. Cl.⁶ .............................................. G09G 1/06
[52] U.S. Cl. ........................................ 345/119; 345/185
[58] Field of Search ................... 340/721, 724, 723;
364/146, 188, 550; 358/108; 345/119, 118, 115,
116, 133, 185, 189, 146; 395/157, 156

[56] References Cited

U.S. PATENT DOCUMENTS

| | | | |
|---|---|---|---|
| 4,789,962 | 12/1988 | Berry et al. | 345/146 |
| 4,890,098 | 12/1989 | Dawes et al. | 340/721 |
| 4,992,866 | 12/1991 | Morgan | 358/108 |
| 5,001,697 | 3/1991 | Torres | 340/723 |
| 5,060,170 | 10/1991 | Bourgeois et al. | 345/119 |

FOREIGN PATENT DOCUMENTS

| | | |
|---|---|---|
| 0171663B1 | 2/1991 | European Pat. Off. . |
| 0185845B1 | 3/1992 | European Pat. Off. . |
| 3425022A1 | 1/1985 | Germany . |
| 3518280A1 | 2/1986 | Germany . |
| 3611335C2 | 8/1987 | Germany . |
| 3618256A1 | 12/1987 | Germany . |
| 3631329A1 | 3/1988 | Germany . |
| 3702220A1 | 8/1988 | Germany . |
| 3707490A1 | 9/1988 | Germany . |
| 0009338 | 1/1977 | Japan .................. 340/721 |
| 58-58507 | 4/1984 | Japan . |
| 61-11615 | 1/1986 | Japan . |
| 61-94483 | 2/1986 | Japan . |
| 177511 | 6/1986 | Japan . |
| 63-46516 | 12/1987 | Japan . |
| 63-046516 | 2/1988 | Japan . |
| 1250129 | 10/1989 | Japan . |
| 1250130 | 10/1989 | Japan . |

OTHER PUBLICATIONS

Brown, Boverie & Cie, "PAN 30-Prozessanzeige" (PAN 30-process Monitorying System), Aktiengesellschaft, No. DAT 1666 83 D, Dec./1983.
"An Empirical Comparison of Pie vs. Linear Menus" Jack Callahant et al. Sep. 1987 pp. 1-14.

Primary Examiner—Ulysses Weldon
Assistant Examiner—Doon Chow
Attorney, Agent, or Firm—Antonelli, Terry, Stout & Kraus

[57] ABSTRACT

A window displaying method suited to the monitoring and operating of the runs of a plant is provided. A display area whose display content is comparatively unimportant is selected from within each of a number of process monitoring frames, and it is registered beforehand as a window area capable of opening a window. In a window display mode, the window is opened in the registered window area, and a window frame is displayed in the window. Thus, an appropriate window display which does not hamper necessary monitoring information can be automatically realized without the operator's needing to carry out window movement, etc. Individual areas for the respective run stages of the process of the plant may well be registered as such window areas. Besides, in a case where a selected one of images picked up by a plurality of television cameras disposed in correspondence with a plurality of devices is displayed in the window, the symbol of the television camera is displayed near that of the corresponding device on a monitoring/operation frame, whereby the position of the television camera can be recognized on the display frame. The symbols of the television cameras are permitted to be designated through touch inputs, whereby desired images can be selected through the touch inputs of the symbols. Moreover, the display attribute of the symbol of the selected television camera is changed, whereby the television camera corresponding to the image presently under display can be recognized.

39 Claims, 26 Drawing Sheets

FIG. 5

702 ALARM MESSAGE

| ALARM NO. | ALARM DESIGNATION | STATE |
|---|---|---|
| B B 1 2 8 | X Y Z WATER LEVEL | LOW |
| A A 2 0 5 | A A I TEMPERATURE | HIGH |
| C C 0 3 3 | E F G H POWER SUPPLY | ABNORMAL |
| ⋮ | ⋮ | ⋮ |

FIG. 8

WINDOW DISPLAY AREA MANAGEMENT FILE FOR FRAME 106
WINDOW DISPLAY AREA MANAGEMENT FILE FOR FRAME 105
WINDOW DISPLAY AREA MANAGEMENT FILE FOR FRAME 104

| No. | STAGE OF WORK | DISPLAY AREA 1 | | DISPLAY AREA 2 | |
|---|---|---|---|---|---|
| | | COORDI-NATES $(x_0, y_0)$ | SIZE $(ex \times ey)$ | COORDI-NATES $(x_0, y_0)$ | SIZE $(ex \times ey)$ |
| 1 | AAa1 | (300, 210) | 540 × 200 | (0, 0) | 480 × 100 |
| 2 | AAa2 | (300, 210) | 540 × 200 | (0, 0) | 480 × 100 |
| 3 | AAb | (300, 360) | 310 × 225 | (200, 80) | 630 × 160 |
| 4 | AAc | (420, 320) | 250 × 300 | (-1, -1) (NOT EXISTENT) | -1 × -1 (NOT EXISTENT) |
| 5 | AAd I | (300, 210) | 540 × 200 | (0, 0) | 480 × 100 |
| 6 | AAd II | (300, 210) | 540 × 200 | (0, 0) | 480 × 100 |
| 7 | AAe | (300, 360) | 310 × 225 | (200, 80) | 630 × 160 |

FIG. 9

| GEOMETRY NO. | SIZE (wx × wy) | WINDOW FRAME GEOMETRIES |
|---|---|---|
| 1 | 630 × 180 (IN WIDTH) (IN HEIGHT) | START STOP RESTART RESET / STAGE xxxxxxxxxxxxxx |
| 2 | 630 × 180 | START STOP RESTART RESET / STAGE xxxxxxxx xxxxxxx |
| 3 | 540 × 200 | START STOP RESTART RESET / STAGE NAME / xxx xxxxxxxxxxxx |
| 4 | 315 × 255 | START RESTART / STOP RESET / STAGE xxxxxxxx xxxxxxx |
| 5 | 270 × 290 | START RESTART / STOP RESET / STAGE NAME / xxxxxxxx xxxxxxx |

| GEOMETRY NO. | SIZE (wx × wy) | WINDOW FRAME GEOMETRIES |
|---|---|---|
| 1 | 540 × 195<br>(IN WIDTH) (IN HEIGHT) |  |
| 2 | 405 × 270 |  |
| 3 | 180 × 522 |  |

FIG.12C

702 ALARM MESSAGE

| ALARM NO. | ALARM DESIGNATION | STATE |
|---|---|---|
| X Y Z | WATER LEVEL | LOW |
| A A I | TEMPERATURE | HIGH |
| E F G H | POWER SUPPLY | ABNORMAL |
| A A RUN, AAbcd STAGE | | INTERRUPTED |

FIG. 14

| NO. OF CIRCULAR WINDOW FRAME | DIAMETER OF BASIC FORM | WINDOW FRAME (STORED IN FRAME DATABASE) |
|---|---|---|
| 2031 | 450 | (composition of liquid A) |
| 2055 | 500 | (composition of liquid B) |

FIG. 16

DISPLAY FRAME MANAGMENT TABLE

| CRT NO. | NO. OF MONITOR-ING FRAME UNDER DISPLAY | STAGE NO. | NO. OF WINDOW FRAME OF AREA 1 UNDER DISPLAY | NO. OF WINDOW FRAME OF AREA 2 UNDER DISPLAY |
|---|---|---|---|---|
| 1 | 104 | 1 | 1010 | 3020 |
| 2 | 206 | 0 | 3220 | 0 |

FIG. 17

WINDOW DISPLAY AREA MANAGMENT FILE FOR FRAME 107

| No. | STAGE | AREAL EXTENT | NUMBER OF APICES | DISPLAY AREA 1 | | |
|---|---|---|---|---|---|---|
| | | | | APICAL COORDINATES $0(x_0, y_0)$ | APICAL COORDINATES $1(x_1, y_1)$ | APICAL COORDINATES 2 |
| 1 | CCa | 108000 | 4 | (360, 220) | (900, 220) | (900, 540) |
| 2 | CCbI | 132000 | 10 | (520, 330) | (640, 330) | (640, 460) |
| 3 | CCbII | 132000 | 10 | (520, 330) | (640, 330) | (640, 460) |

FIG. 18

WINDOW DISPLAY AREA AND GEOMETRY MANAGMENT FILE FOR FRAME 107

| No. | STAGE | DISPLAY AREA 1 | | DISPLAY AREA 2 | |
|---|---|---|---|---|---|
| | | COORDINATES $(x_0, y_0)$ | WINDOW FRAME GEOMETRY No. | COORDINATES $(x_0, y_0)$ | WINDOW FRAME GEOMETRY No. |
| 1 | CCa | (360, 220) | 2 | (-1, -1) (NOT EXISTENT) | -1 (NOT EXISTENT) |
| 2 | CCbI | (520, 300) | 8 | (0, 0) | 5 |
| 3 | CCbII | (520, 300) | 8 | (0, 0) | 5 |

FIG. 20

MONITORING/OPERATION FRAME — IMAGE MANAGEMENT TABLE

| MONITORING/OPERATION FRAME | | IMAGE MANAGEMENT | | | | IMAGE ATTRIBUTE | |
|---|---|---|---|---|---|---|---|
| No. | DESIG-NATION | No. | OBJECT DEVICE No. | OBJECT DEVICE NAME | PRIORITY LEVEL FOR DISPLAY | VIEW OF IMAGE | IMPOR-TANCE FOR RUN | NECES-SITY FOR MONITOR-ING |
| 100 | | | | | | | | |
| 104 | MONITOR-ING OF AA RUN | a | F001 | VALVE | 1 | X | | |
| | | | | | 3 | Y | ○ | |
| | | b | E001 | PUMP | 2 | X | ○ | ○ |
| | | | | | | Y | | |
| | | | | | | Z | | |

PROCESS MONITORING SYSTEM AND A WINDOW DISPLAYING METHOD THEREFOR

BACKGROUND OF THE INVENTION

1. Field of the Invention

The present invention relates to a process monitoring system which backs up the running of a plant by the use of a computer and a display device. Also, it relates to a window displaying method which offers display picture frames well suited to monitoring and operations.

2. Description of the Related Art

A process monitoring and control system for monitoring and controlling the installations of a plant generally comprises a display device such as a CRT, and an operation input terminal such as a touch panel, light pen or mouse, capable of giving operation inputs on the display screen of the device, in order to integrate the information of the plant and to enhance the operability of the plant.

Run monitoring picture frames to be displayed on the display device are in the number of several tens in a small scale plant, and can even reach the number of several hundred in a large scale plant.

In the case of a system furnished with a plurality of CRTs, the operator of the plant monitors the runs of the plant with necessary frames displayed in parallel. However, in a case where only one CRT is disposed or where the number of CRTs is insufficient for the frames desired to be displayed, the operator must changeover the display frames frequently.

In recent years, the techniques of divisional frame display, window display, etc. have been adopted as methods for integrally displaying information items on a single frame.

As can be seen from, for example, a plant monitoring system as described in Japanese Patent Application Laid open No. 177511/1986, the window display is such that an alarm frame or a guidance frame is displayed in superimposed relation on a plant monitoring frame, and the operator of a plant commands the system to display, erase and move windows by the use of a keyboard, a mouse or the like, thereby obtaining the optimum display frame. Further, although not directly relevant to plants, a technique which concerns the enlargement, reduction and display position alteration of a window is disclosed in Japanese Patent Application Laid-open No. 250129/1989, and a technique according to which, in the case of displaying a plurality of windows in succession, an empty area capable of window display on a frame without overlapping any of the existent window areas is ascertained so as to set a new window in the empty area, is disclosed in Japanese Patent Application Laid open No. 250130/1989.

The prior art method for monitoring a plurality of frames without using the window display, has the problem that the operations of changing over the frames are troublesome in the case of a single an insufficient numbers of CRTs.

Besides, with the prior:art method wherein, when the window is to be displayed on the single frame, the display position (coordinates) of the window and the size thereof are fixed, so in order to observe information in an undisplayed portion of the window, the window must either be moved and displayed, or erased and then redisplayed by the use of a the mouse or the like. This similarly incurs the problem of troublesome operations. Further, the prior-art method wherein an empty area not overlapping any of the existent window areas is ascertained in order to avoid an overlap of the windows cannot be directly applied to the monitoring of the running of a plant. The reason for this is as follows: The monitoring frame, or the like, of the plant is displayed on the whole screen, and it is considered as one existent window. Accordingly, the empty area which avoids the overlap of the windows when displaying the new window does not originally exist, and the new window is inevitably displayed superimposed on the monitoring frame or the like.

Meanwhile, as another prior-art technique, Japanese Patent Application Laid-open No. 46516/1988 or No. 94483/1986 discloses a process monitoring system wherein the monitoring image of plant installations or the like picked up by an industrial television camera is digitized and processed and wherein the digital image is displayed on a display device simultaneously with the monitoring data of a object process to be controlled.

The prior-art technique refers to the fact that the monitoring control information items and the video information of the installations or the like, which are relevant to each other, are simultaneously displayed, or the fact that a frame in computer graphics is automatically displayed upon the generation of an abnormal signal in a plant. However, it does not take into consideration the monitoring and handling capabilities of the system for an operator who actually monitors and handles the system on and through the display device. This poses a problem as to a man machine interface. More specifically, the technique leaves room for improvement in the man-machine interface regarding, for example, how a device to be operated is selected and acknowledged, how the corresponding relation between the image and the device is acknowledged, and when and how each image is selected.

SUMMARY OF THE INVENTION

It is accordingly an object of the present invention to provide a process monitoring system which is capable of a window display suited to the monitoring and operating of the run of a plant, and a window displaying method therefor.

Another object of the present invention is to provide a process monitoring system which is capable of a window display suited to the monitoring of the run of a plant, without requiring troublesome window operations, and a window displaying method therefor.

Still another object of the present invention is to provide a process monitoring system which is capable of a window display forming no obstacle to tile monitoring of the run of a plant, in a picture frame for monitoring the plant run, and a window displaying method therefor.

It is also an object of the present invention to provide a process monitoring system in which monitoring control information and video information are merged to a high degree, thereby forming a user-friendly man-machine interface that affords excellent monitoring and handling capabilities for the operator of a plant.

In order to accomplish these objects, a window displaying method for a display device included in a process monitoring system for a plant, according to the present invention, provides for registering window areas capable of displaying windows, for respective display frames beforehand; and displaying a window frame in the window area registered for the display frame presently under display, upon a request for the window display.

Preferably, said window areas are previously registered individually for respectively different run states of said plant, with respect to the identical display frame.

A plurality of window frames which differ in at least either size or shape are prepared for the window frame of substantially identical content, and the largest window frame which can be received in the window area is selected from among said plurality of window frames. In the case where the shapes of said plurality of window frames of substantially identical content are different, the arrangement of the display items is made different.

It is also possible that the diameter of the window frame is changed in accordance with the size of the window area, and that the window frame of the changed diameter is displayed in said window area.

Further, as to a window frame larger than the window area, it is also possible that only that part of said window frame which corresponds to the size of said window area is displayed in said window area, and that said window frame in said window area is permitted to move.

A process monitoring system according to the present invention comprises a process input unit which receives process information from said plant; a display device capable of window display, which displays a process monitoring frame on the basis of the process information obtained from said process input unit; window area management means for managing information items of window areas set for the respective process monitoring frames; window frame data storage means for storing display data items of a plurality of sorts of window frames; window display frame management means for managing information items each specifying the monitoring frame presently under display; an input device through which a request for displaying a specified one of said window frames is made; and window display control means responsive to the window display request through said input device, for acknowledging said monitoring frame presently under display with said window display frame management means, for acknowledging the window area set for said monitoring frame with said window area management means, and for fetching the display data of the specified window frame from said window frame data storage means and then displaying the fetched display data in said window area.

With the window displaying method for a display device in a process monitoring system according to the present invention, in each display frame, such as a monitoring frame, a display area whose display content is comparatively unimportant is selected and registered as the window area capable of window display beforehand. In a case where, even in the identical display frame, the display area whose display content is comparatively unimportant changes depending upon the present state (or run stage) of the plant, a plurality of window areas are selected for the respective run states of the plant beforehand.

Thus, an appropriate window display frame which does not hamper necessary monitoring information can be automatically constructed and displayed. Therefore, the operator need not perform troublesome operations, such as the movement of a window, and the monitoring and handling capabilities of the system are enhanced.

By the way, the size, shape etc. of the window area to be set beforehand differ depending upon the individual display frames (and run states). Therefore, when a plurality of window frames which differ in the arrangement of display items and in shape etc. are previously prepared as the window frames which contain the same display items, the optimum window frame receivable in any desired window area can be selected. Also, the window frame can be received in any desired window area by changing the size of this window frame.

Accordingly, all the necessary display items of the window frame can be exhibited in any desired window area without regard to the differences in size, shape etc. of the window areas.

Meanwhile, another window displaying method according to the present invention consists of a window displaying method for a display device included in a process monitoring system for a plant, comprising the steps of: disposing a plurality of television cameras in correspondence with a plurality of devices for a process; displaying a process monitoring/operation frame in which said plurality of devices are expressed by their symbols, on said display device, together with those symbols expressive of said plurality of television cameras, which are respectively displayed near said symbols of said devices corresponding to said television cameras; opening a window in said process monitoring/operation frame; and displaying an image picked up by any of said plurality of television cameras, in said window.

Preferably, the window displaying method is so constructed that said symbols expressive of said television cameras are permitted to be designated on the display frame through touch inputs, and that the image frame to be displayed in said window is selected by designating the symbol.

In addition, as to the television camera which corresponds to the image frame presently under display in said window, a display attribute of the symbol of the television camera is changed.

Further, an automatic mode and a manual mode are provided as image frame selection modes for displaying the image frame of any of said plurality of television cameras in said window, and in said automatic mode, the image frame of a preset high priority level is automatically selected for said process monitoring/operation frame, while in said manual mode, the desired image frame is selected by designating said symbol expressive of said television camera.

Other features and advantages of the present invention will become obvious from the following detailed description of the invention when read in conjunction with the accompanying drawings.

BRIEF DESCRIPTION OF THE DRAWINGS

FIG. 5 is a diagram for explaining an example of an alarm message frame;

FIG. 8 is a diagram for explaining the organization of a window display area management file;

FIGS. 9 and 10 are explanatory diagrams each showing the exemplary geometries of a window frame;

FIGS. 12A thru 12C are explanatory diagrams each showing the exemplary display of a multiwindow frame according to the present invention;

FIG. 14 is an explanatory diagram of examples of the picture of a circular window frame and the diameter of the basic form of the frame;

FIG. 16 is an explanatory diagram showing the format of a display frame management table which is used in the embodiment;

FIG. 17 is an explanatory diagram showing the organization of a file which manages window display areas in any desired polygons;

FIG. 18 is an explanatory diagram showing the organization of a management file in which the optimum window geometries are determined for window display areas beforehand;

FIG. 20 is a diagram for explaining the management of display frame information items in the embodiment of FIG. 19;

DETAILED DESCRIPTION OF THE PREFERRED EMBODIMENTS

Now, an embodiment in the case of applying the present invention to a process monitoring and control system will be described in detail. Although the control of a process will be also referred to in this embodiment, it is to be noted that this embodiment concerns the monitoring of the process and is not directly pertinent to the control of the process.

Figure 2:
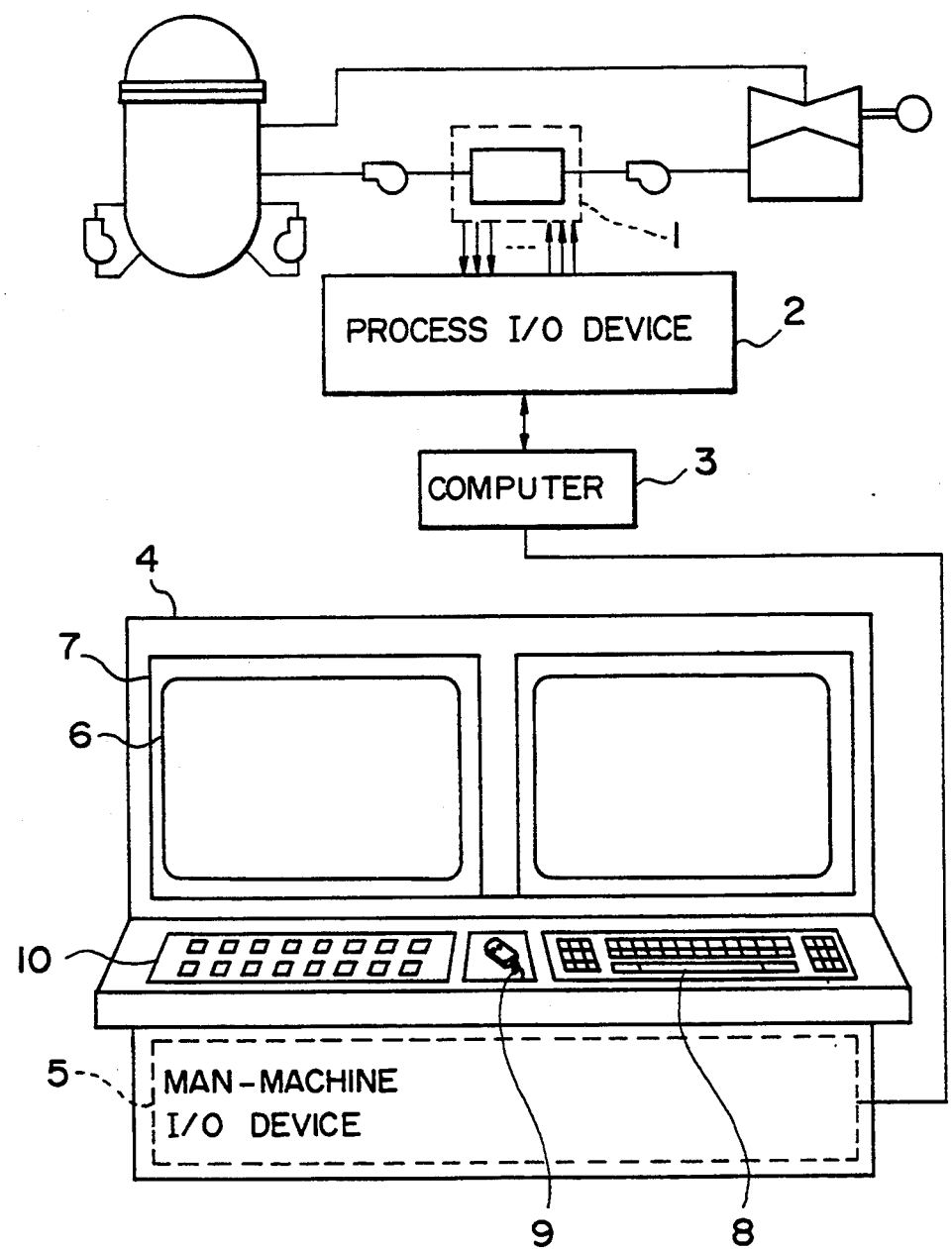
FIG. 2 is a block diagram showing the outline of the overall construction of a plant which is equipped with a process monitoring system.

First, FIG. 2 shows the outline of the whole architecture of the process monitoring and control system. In the illustrated example, a plant to be monitored and controlled is the condensate water clean-up plant of a nuclear power station.

The process information of the plant 1 is received by a computer 3 through a process I/O (input/output) device 2. The computer 3 collects and edits the process information items, and delivers process state display information to a man-machine I/O device 5. The operator of tile plant 1 monitors the running state of this plant by viewing display picture frames on the CRT displays 6 of a man-machine console 4 and lamp indicators on the operator's panel 10 thereof. In addition, the operator performs start/stop operations for automatic plant running, opening/closing operations for individual valves, etc. by the use of operation input terminals, such as a touch panel 7, a keyboard 8, a mouse 9, and depression switches provided in the operator's panel 10. Operation information items in such a case are decoded by the computer 3, and a command signal is output to the plant 1 through the process I/O device 2 when operation conditions have been met.

Figure 1:
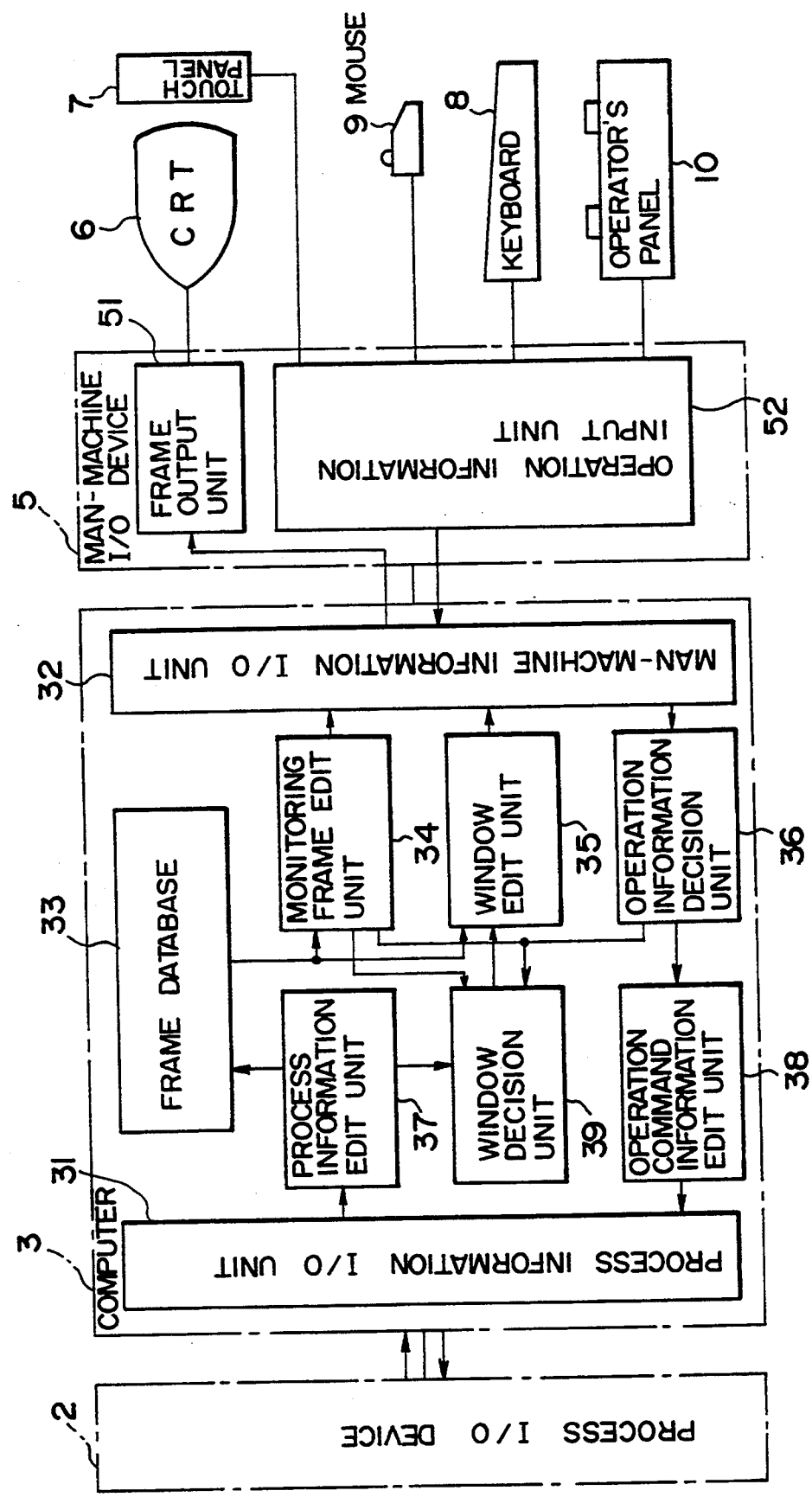
FIG. 1 is a block diagram of a process monitoring/control system according to an embodiment of the present invention.

Next, FIG. 1 shows the internal architecture of tile process monitoring and control system according to this embodiment. A process information I/O unit 31 receives the process information from the process I/O device 2, and delivers the input information to a process information edit unit 37. The process information edit unit 37 edits the items of information on the states of the valves and pumps, the stages of work of the run of the plant (1 in FIG. 2), an alarm, etc. into picture frame display information, which is stored in a frame database 33. Besides, the items of operation information from the input terminals 7–10 of tile man-machine console (4 in FIG. 2) are received by an operation information input unit 52 constituting the man-machine I/O device 5, and they are sent to an operation information decision unit 36 through a man-machine information I/O unit 32. The operation information decision unit 36 delivers the operation information to an operation command information edit unit 38 when this operation information indicates a plant running operation, and to a monitoring frame edit unit 34 when it indicates a frame change-over operation. Upon the establishment of the operation condition, the operation command information edit unit 38 generates a command signal, which is output to the process I/O device 2 through the process information I/O unit 31. On the other hand, subject to a reasonable request for a frame change-over, the monitoring frame edit unit 34 fetches display frame data from the frame database 33 and supplies it to a CRT frame output unit 51 in the man-machine I/O device 5 through the man-machine information I/O unit 32.

Here, a plant monitoring and control system in the prior art will be explained for the sake of comparison. In the prior-art system, window operation information among the frame operation information items delivered to the operation information decision unit 36 is sent directly to a window edit unit. Then, the window edit unit fetches window frame information from a frame database, whereby a window of fixed size is displayed at a predetermined position irrespective of the content of a monitoring frame presently under display. Therefore, the operator of the system needs to perform troublesome operations so that the window is moved to an area of the monitoring frame not obstructive of monitoring or to erase the window and redisplay it in order to see a hidden part.

In contrast, the present invention possesses a window decision unit 39 as shown in FIG. 1, making it possible to display a window of optimum shape in that area of a monitoring frame presently under display which does not overlap any content part presently required for the monitoring.

Figure 3:
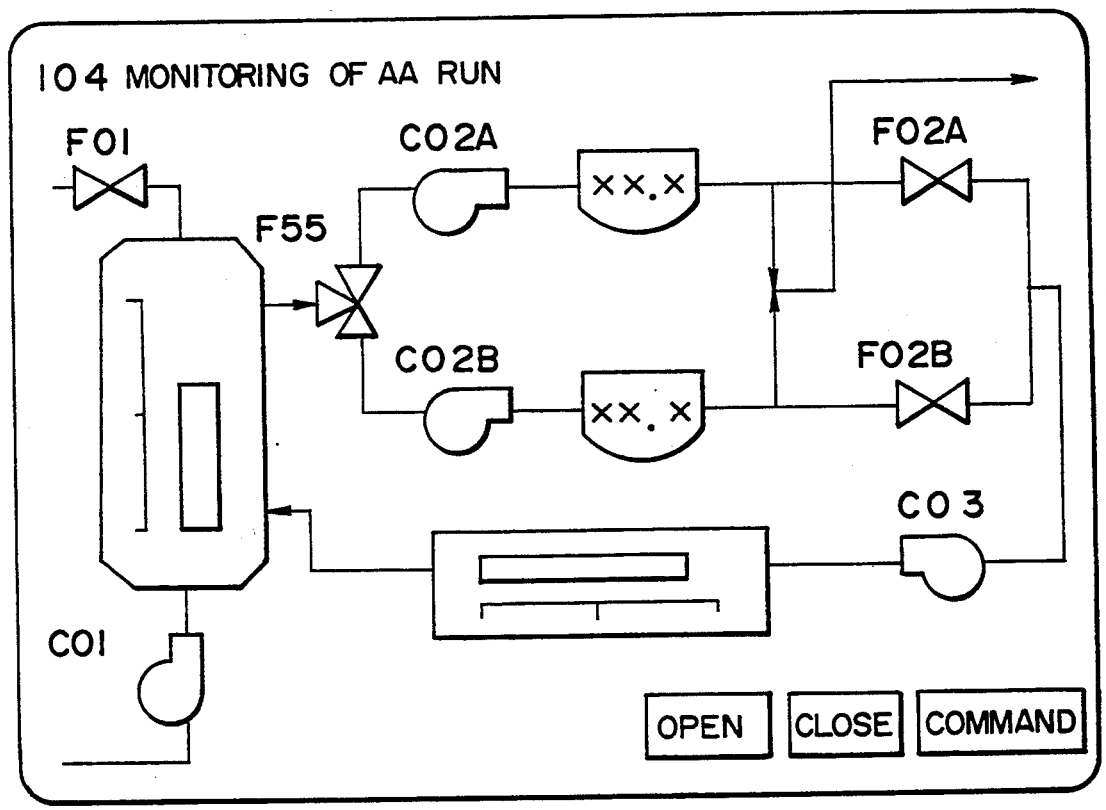
FIG. 3 is a diagram for explaining an example of a plant system chart monitoring frame.
Figure 4:
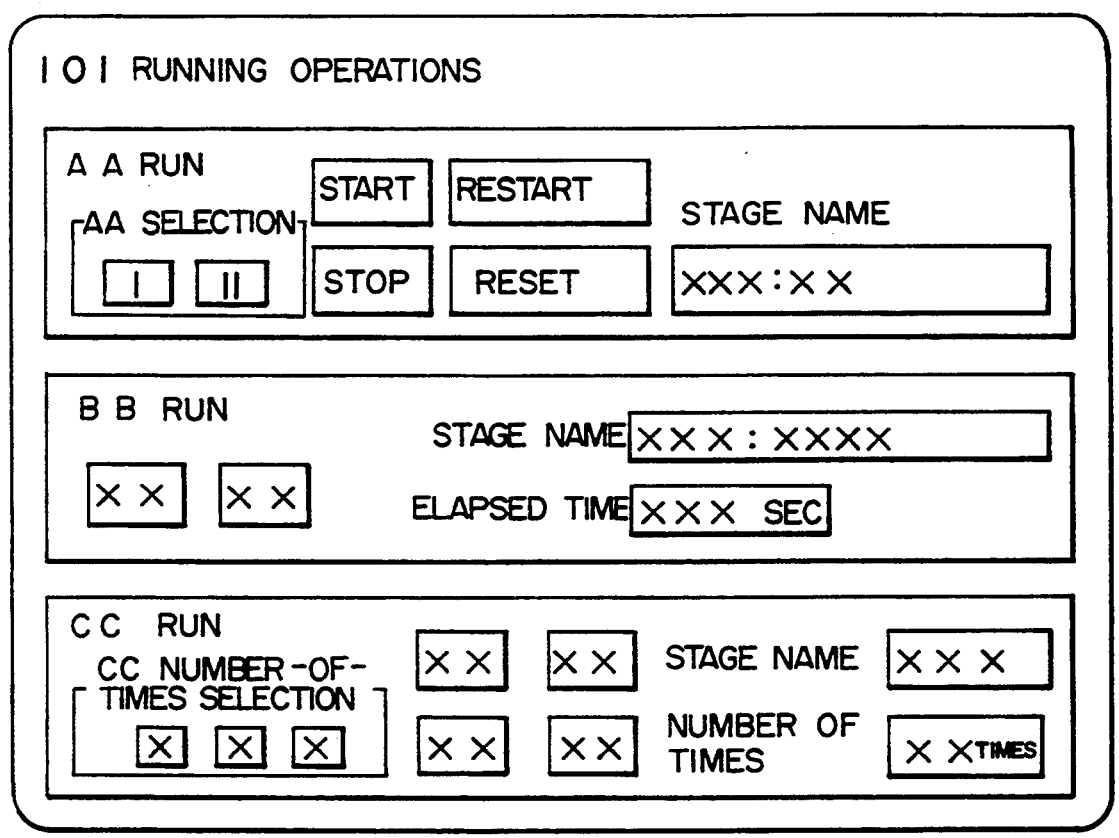
FIG. 4 is a diagram for explaining an example of a running operation frame.

FIGS. 3–5 show exemplary display frames in the system of this embodiment.

The example in FIG. 3 is a monitoring frame which is based on a plant system chart, and which corresponds to "AA run" being one of the subprocesses of the process of the plant. On this monitoring frame, analog information items on the open/closed states of valves F01, F55 etc., the ON/OFF states of pumps C01, C02A etc., a flow rate, a liquid level, a temperature, and so forth are monitored, and the operations of the individual auxiliaries, such as the valves and pumps, can be commanded through touch operations. FIG. 4 illustrates a running operation frame in which the run operation switches of the subprocesses of the plant process are put together into one frame. By way of example, the AA run is automatically started by the touch operation of the "START" switch, and the auxiliaries, such as the valves and pumps displayed on the monitoring frame of FIG. 3, are automatically actuated. The AA run is divided into several stages of work. Each time the stages shift, the name of the new stage is displayed, and the operations of the auxiliaries are also changed. The stage can be stopped by the operation of "STOP" switch, and the stopped stage can be restarted by operation of the "RESTART" switch. Further, FIG. 5 illustrates an alarm message frame. Here, Nos. of various alarms, the designations of the alarms, and states corresponding to the alarm designations are displayed as alarm messages. The frames as shown in FIGS. 3–5 are respectively endowed with specific frame Nos.

In the presence of three usable CRTs, the operator can monitor the running with the above three frames displayed in parallel. In the presence of two CRTs or only one CRT, however, he/she must monitor the running while changing-over the frames.

Figure 6:
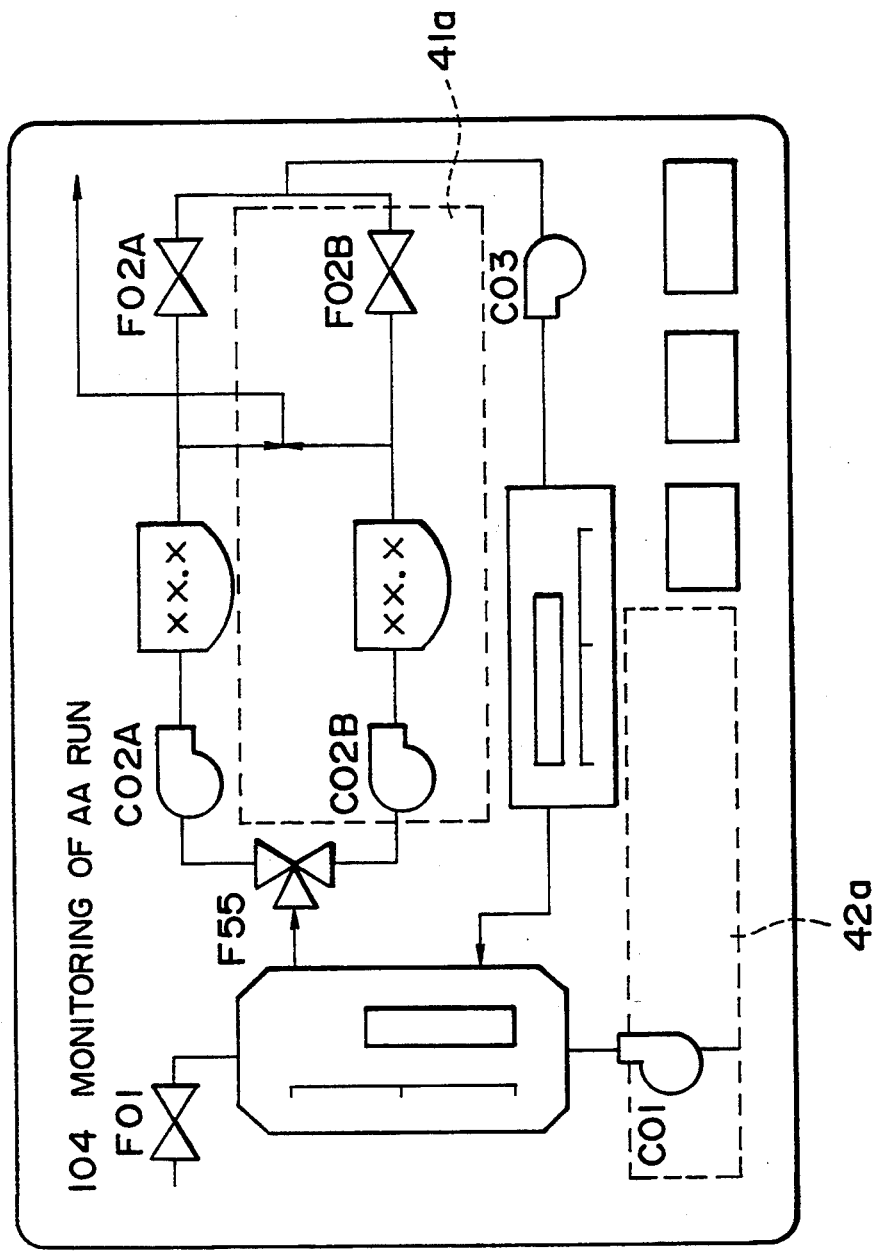
FIGS. 6 and 7 are explanatory diagrams each showing an example of areas which are capable of displaying windows on a monitoring frame at the specified stage of a run.
Figure 7:
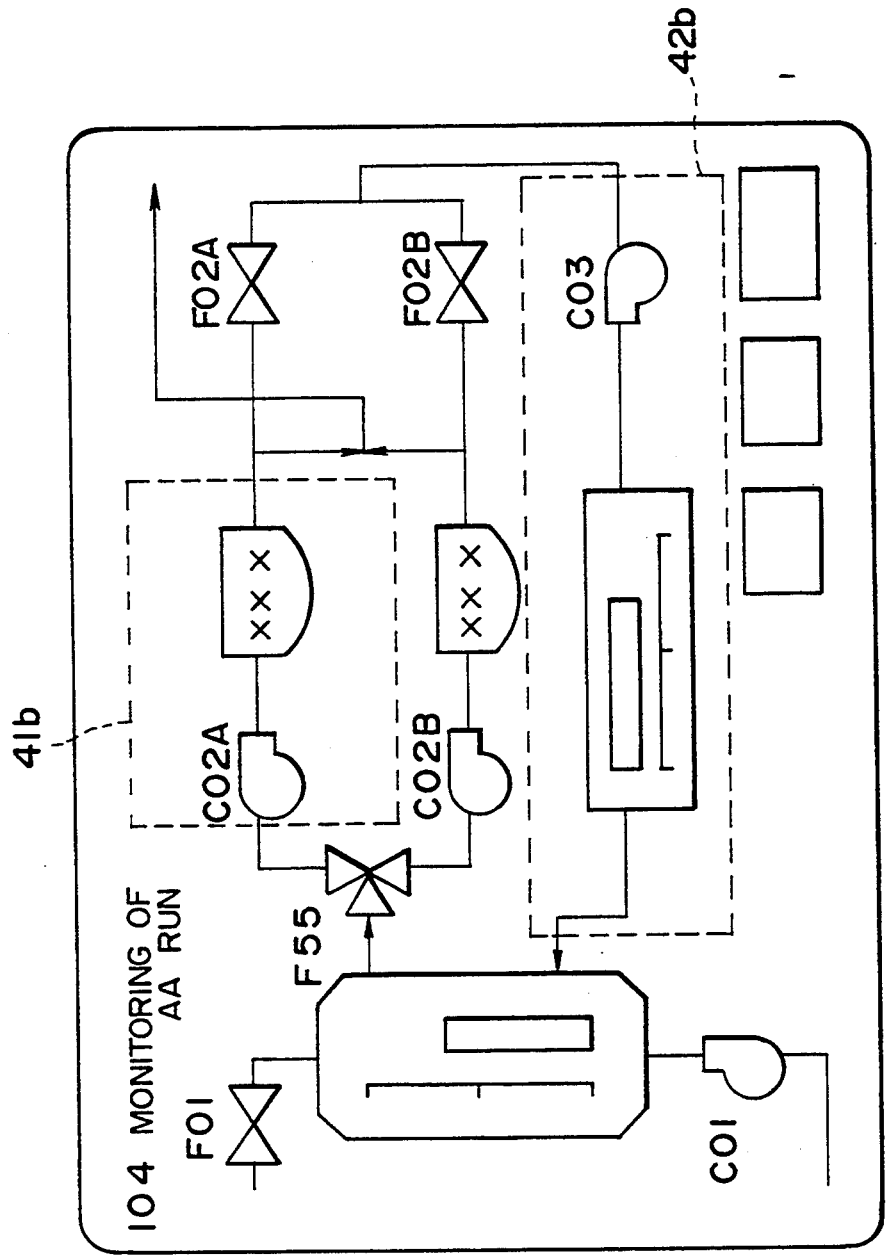

Meanwhile, in the case where the AA run, for example, is monitored, all the information items of the three frames are not required. By way of example, only the displays of the operation switches for the AA run and the name of the stage of this run are necessary in the running operation frame of FIG. 4, and only the messages concerning the AA run are necessary in the alarm message frame of FIG. 5. Also in the AA run monitoring frame of FIG. 3, all the auxiliaries need not always be monitored because which auxiliaries operate at each stage are defined. Assuming, by way of example, that the valve F02B and the pumps C02B, C01 do not operate at stage AAa1, monitoring is not adversely affected even when the display information items of two areas 41a and 42a as shown in FIG. 6 are hidden. Accordingly, it causes no harm to open or display windows in these areas. FIG. 7 shows the same run monitoring frame as in FIG. 6, but it exemplifies a case where another stage is in progress. Even in the identical run monitoring frame, the parts which need not be watched can differ at the different stages. In the example of FIG. 7, areas 41b and 42b different from the areas in FIG. 6 are usable for window display. FIG. 8 shows an example of a window display area management file in which, for each monitoring frame, areas capable of window display at the respective stages of the corresponding run are registered as tile information items containing the coordinates (x0, y0) of the left lower corners of the areas and the sizes ($e_x \times e_y$) of the areas. In this embodiment, the two areas are managed, and the nonexistence of the displayable area is denoted in terms of '−1' as all the values x0, y0, $e_x$ and $e_y$ (refer to frame No. '104' and stage No. '4' in FIG. 8). The number of the areas to be managed is not restricted to two, but it may well be one or three or more. Data processing for registering this file should desirably be executed by a person who is acquainted with the degrees of importance of the display contents of each frame at the respective stages, or by consulting tile person. In this embodiment, tile register processing is executed when the system is built. A user may well be permitted to renew and alter the registration.

FIG. 9 shows a few examples of window geometries in the case where a window is opened or displayed in part of the operation frame of the AA run. As operation window frames of substantially the same operation contents, windows of various geometries can be generated by changing the sizes or arrangement of the touch switches or by making a layout alteration such as replacing the stage name indication in one line with that in two lines. These window frames have different geometry Nos., but they have an identical window frame No. (for example, window frame No. '1010'). Incidentally, the display data items of these windows are previously stored in the frame database 33 so as to be retrievable with the window frame Nos. and the geometry Nos. as indices.

Figure 10:
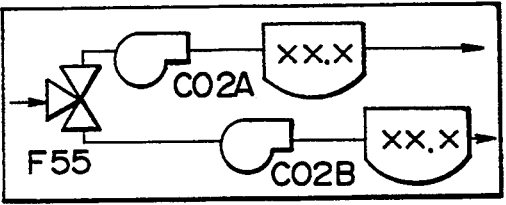
Figure 10:
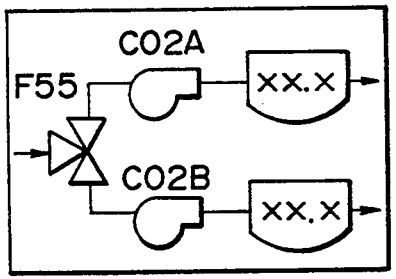
Figure 10:
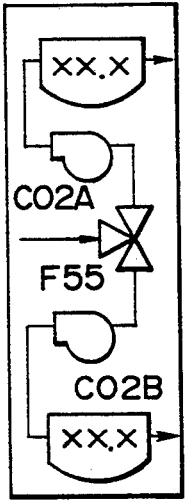

FIG. 10 shows a few sorts of window geometries in the case where part of the monitoring frame is opened or displayed as the window frame. Likewise to the case of the operation frame in FIG. 9, the plurality of sorts of window geometries are prepared by altering the layout of the same display items.

Figure 11:
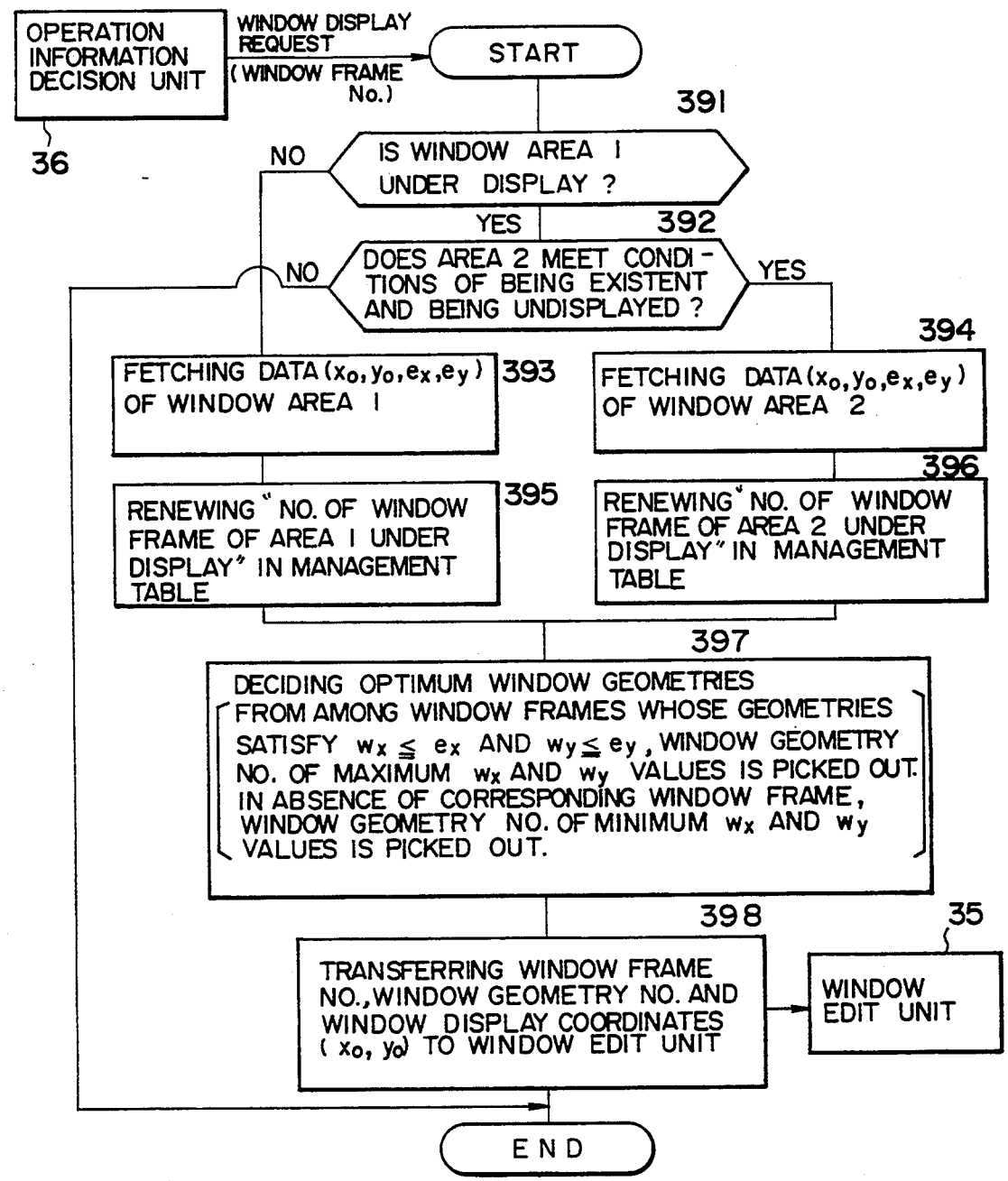
FIG. 11 is a flow chart of the internal processing of a window decision unit in the present invention.

FIG. 11 shows the outline of processing in the window decision unit 39 depicted in FIG. 1. The window decision unit 39 possesses the window display area management files in FIG. 8, the size information items of the window geometries in FIGS. 9 and 10, and a display frame management table in FIG. 16. In the display frame management table in FIG. 16, there are stored the Nos. of monitoring frames being presently displayed by the individual CRTs 6, which are received from the monitoring frame edit unit 34, and the Nos. of the present stage of the run concerning the monitoring frames under display, which are received from the process information edit unit 37.

As illustrated in FIG. 11, upon the operator's operation of a window display request by, e.g., depressing the window frame No. switches of the operator's panel 10, the operation information decision unit 36 recognizes the request to be the window operation and delivers the window frame No. of the pertinent operation to the window decision unit 39. Thus, the processing of the window decision unit 39 is started. At a step 391, if the No. of a window frame under display in the area 1 of the corresponding CRT, which No. is contained in the display frame management table (FIG. 16), is not '0', the unit 39 decides that the area 1 is already under display. At a step 392, in a case where the area 2 of the window display is nonexistent (the area information in FIG. 8 is '−1') or where it is now under display, the unit 39 ends the processing upon deciding that there is no empty display area. In a case where the window area 1 is not under display at the step 391, the processing shifts to a step 393, and in a case where the area 2 exists and is not under display at the step 392, the processing shifts to a step 394. At the step 393 or 394, the information items x0, y0, $e_x$ and $e_y$ of the pertinent monitoring frame and stage of the corresponding area are fetched from the window display area management file (FIG. 8). At the next step 395 or 396, the No. of the window frame of the corresponding area under display, which No. is contained in the display frame management table (FIG. 16), is renewed to the No. of the window frame which is to be displayed this time.

Subsequently, a step 397 executes processing for deciding the optimum window geometries. The processing is such that, from among the window geometries of the designated window frame as depicted in FIG. 9, the No. of the window geometries of the largest size is picked out from among those having the sizes $w_x \times w_y$, which enter the area $e_x \times e_y$.

In the absence of any window entering the area $e_x \times e_y$, the No. of the window of the smallest size is picked out. On this occasion, the window frame picked out protrudes from the window area. In this embodiment, the part protruding from the area is not displayed. However, a method of displaying the protruding part is also considered.

An algorithm which consists of comparing the magnitudes of numerical values and deciding on the maximum value, may be applied to the processing for deciding the optimum window geometries. Alternatively, another technique such as inference rules or fuzzy rules for finding the optimum solution may well be employed.

Lastly, at a step 398, the window decision unit 39 transfers the window frame No., the window geometry No. and the window display coordinates (xO, yO) to a window edit unit 35 (refer also to FIG. 1).

The window edit unit 35 fetches the window frame display data of the corresponding window frame No. and geometry No. from the frame database 33 and sends the fetched data to the CRT frame output unit 51 together with the window display coordinates. The CRT frame output unit 51 causes the CRT 6 to display the pertinent window.

In the example of FIG. 11, the propriety of use is decided in the order of the area 1 and the area 2 which are registered in the window display area management file (FIG. 8). That is, in a case where all the areas are empty, the area 1 has the highest priority level, and the priority levels of the area 2, et seq. lower in succession. Accordingly, the areas which are used earlier at the respective stages in each frame are determined by the way in which the window display area management file is registered. The area which is endowed with the higher priority level can be determined at will at the registration of the window display area management file, depending upon the areal extent or size of the pertinent area, the degree of importance of the display of the pertinent area portion, etc.

Besides, in the example of FIG. 11, in the case where both the window areas 1 and 2 are unusable on account of being presently under display, the processing is ended without any further step. Accordingly, the operator performs the operation of erasing either of the windows presently under display and thereafter makes a window display request again. As a substitutive expedient, it is also possible that, when both the window areas are unusable, the area of lower priority level (in this example, the area 2) is automatically erased so as to be utilized for the new window display. Alternatively, a window frame having been displayed for the longest (or shortest) time may well be selected as the window frame which is to be automatically erased. Also, the window to be erased can be selected on the basis of the areal extent or size of the window area or window frame.

Figure 12A:
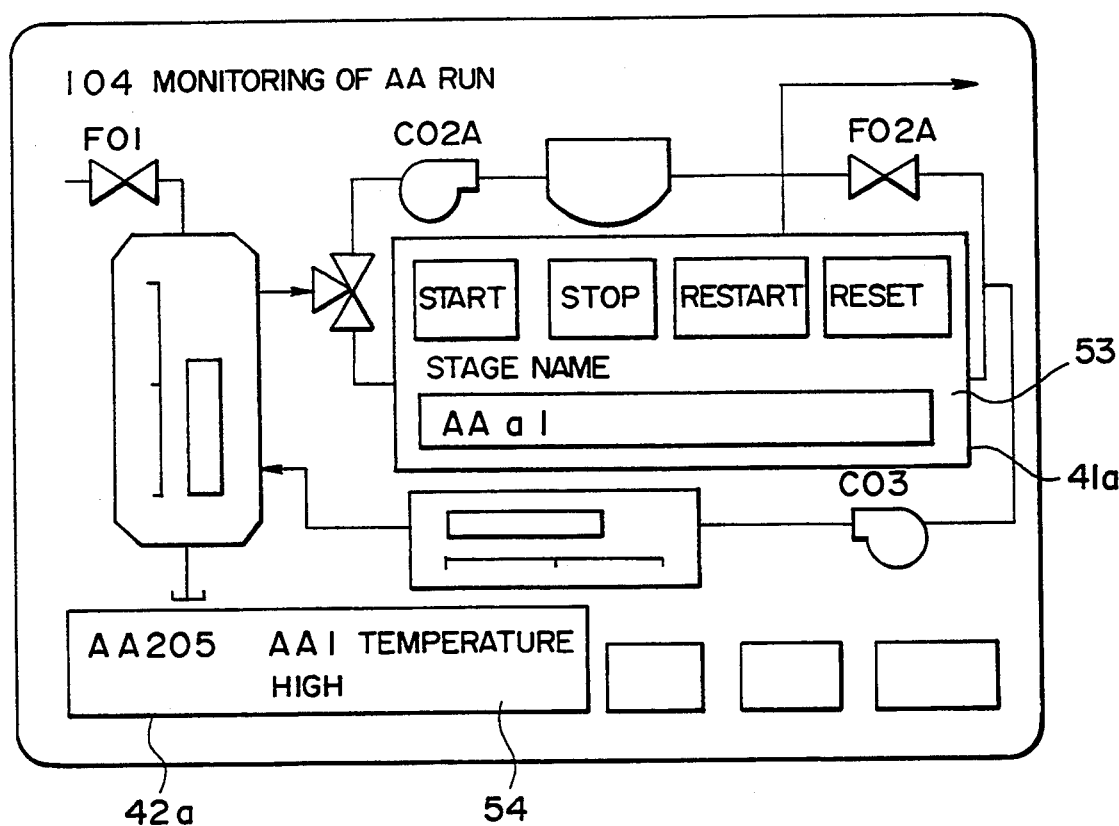
Figure 12B:
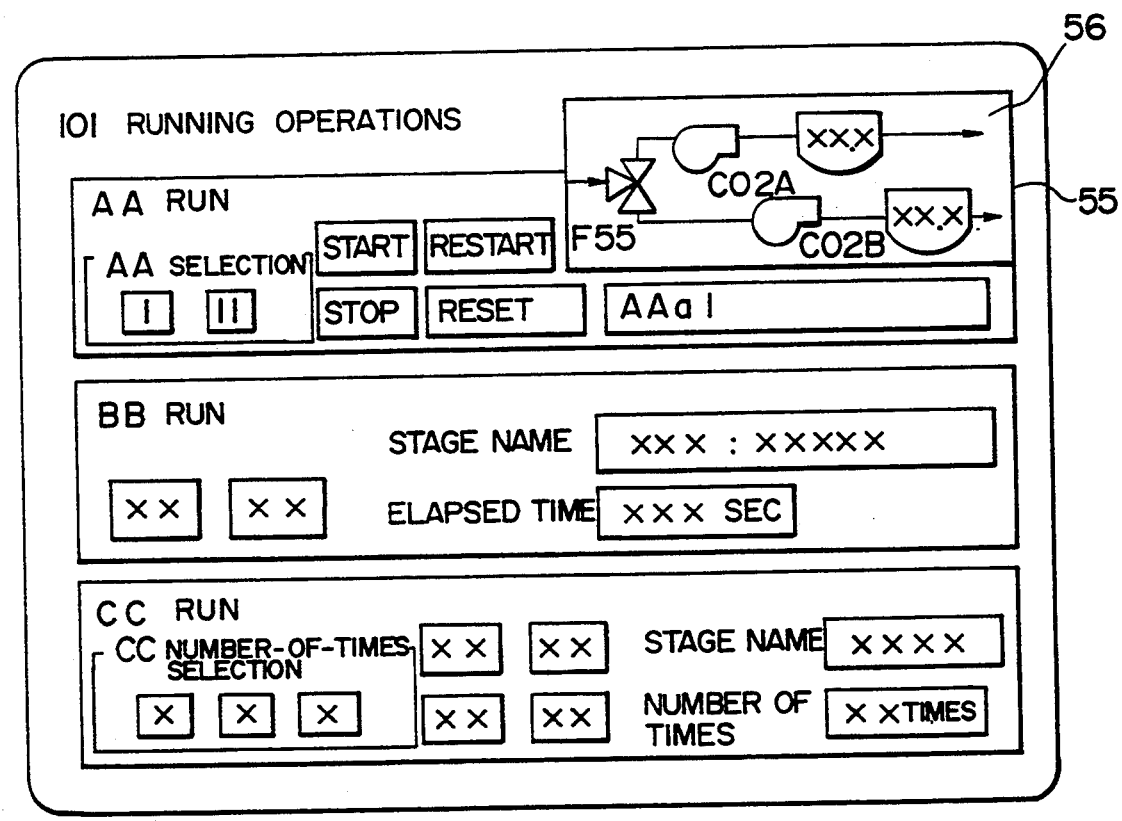

FIGS. 12A–12C show exemplary frame displays each of which is subjected to the window display according to the present invention. In FIG. 12A, the AA running operation-window frame 53 (window frame No. '1010', geometry No. '3') is displayed in the area 1 (41a) of the AA run monitoring frame, and an alarm message window frame 54 is displayed in the area 2 (42a). In FIG. 12B, a monitoring window frame 56 is displayed in the area 1 (55) of the running operation frame. Further, in FIG. 12C, a monitoring window frame 58 which is the same as the window frame in FIG. 12B, but which differs therefrom in geometries, is displayed in the area 57 of the alarm message frame.

Thus, on the screen of one CRT presently displaying required information, other necessary information can be displayed within limits which do not hamper the recognition of the required information, so that the efficient monitoring of the run of the plant can be realized.

Figure 13:
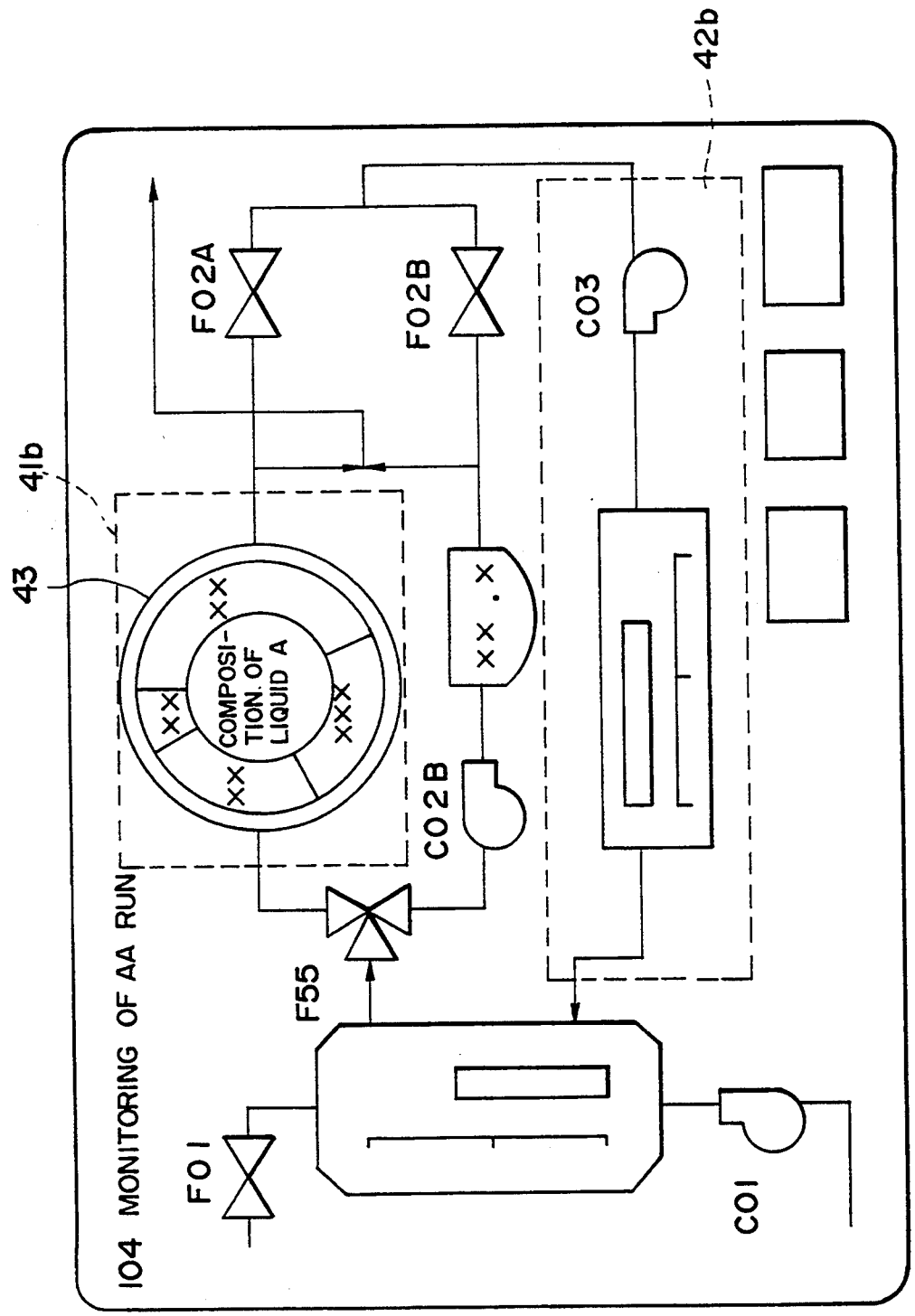
FIG. 13 is an explanatory diagram of the exemplary display of a circular window frame.

FIG. 13 shows an example in which a circular graph is displayed by a circular window. As illustrated in FIGS. 9 and 10, in the case where the shape of the window frame is tetragonal, the plurality of sorts of window frame geometries are prepared for the identical window frame. In case of circular window frames, however, owing to the fact that the only variable factor of circles is only the size (diameter), one basic picture for the window frames may be kept stored in the frame database 33, whereupon the window picture may be subjected to an enlarged or reduced display in conformity with the size of a window area.

FIG. 14 exemplifies circular window frames, the diameters of the basic forms of which can be managed by the window decision unit 39. By way of example, in a case where the window frame No. 2031 is desired to be displayed in the window display area 1 (41b) of the frame 104 in FIG. 13 at the time of a run stage AAb, the size of the area 1 at the run stage is 310×225 in the light of the management file in FIG. 8, and hence, the distance of the shorter side of '225' is set as the diameter of the window. Then, since this diameter is equal to half of the diameter '450' of the basic form in FIG. 14, the window picture may be displayed at a magnification of '0.5'. The window decision unit 39 supplies the window edit unit 35 with the window frame No. '2031', the magnification '0.5' and the coordinates of a display center (the coordinates of the center of the area). Then, the window edit unit 35 fetches the display data of the corresponding window frame from the frame database 33 and sends the fetched data to the CRT frame output unit 51 together with the coordinates and the magnification. The background picture is displayed in that domain within the window area in which the window frame does not exist. This applies also to the foregoing case of the tetragonal window frame.

In the above way, the display frame in FIG. 13 is obtained.

Incidentally, also in the case where the shapes of the window frames are tetragonal as shown in FIGS. 9 and 10, only one window frame form may be prepared for the window frames of the same content, whereupon the prepared window frame may be enlarged or reduced so as to be receivable in any desired window area. On this occasion, there are considered an expedient in which the height and width of the window frame are changed with an identical magnification, and an expedient in which the height and width are changed with separate magnifications so as to cover the whole window area.

Figure 15:
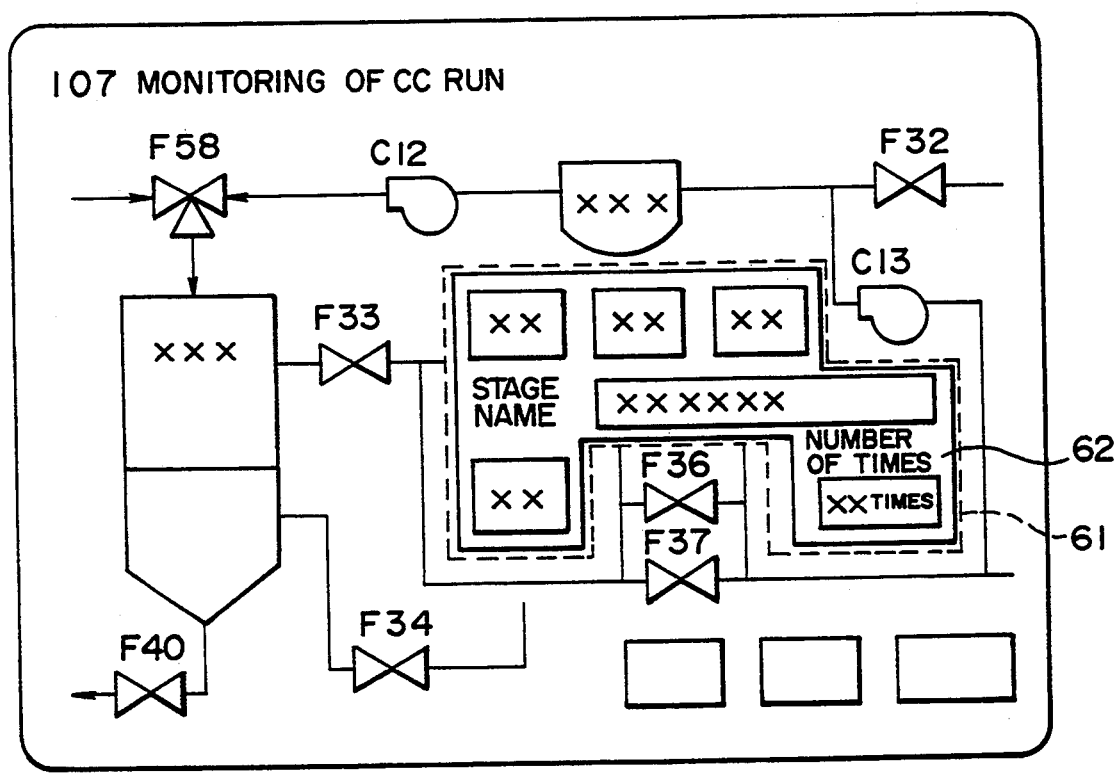
FIG. 15 is an explanatory diagram showing a window display area of complicated shape and the exemplary display of a window frame.

FIG. 15 shows a window area with a complicated shape other than a tetragon, and the display example of a window frame. In a case where a display area of sufficient size cannot be secured with the simple tetragon, a polygonal area which does not include auxiliaries therein as in this figure can be contrived. On this occasion, as shown in FIG. 17, polygonal display areas for the respective stages are managed in terms of information items such as an area extent or size, the number of angles, and coordinates of these angles. Similarly, window frames are kept stored in the frame database 33 as various polygons, whereupon a window frame in a shape most suited to the window area can be selected and displayed as in the foregoing.

By the way, in the case of such a window area of complicated shape, an algorithm or rules for deciding the window frame of optimum shape become(s) considerably complicated, and the program capacity and processing time period required for the decision processing increase to reduce practicability. Accordingly, there is considered a window displaying method in which the optimum shape is not selected from among the window geometries generated at will, but window frame geometries suited to area shapes are generated and are endowed with geometry Nos. beforehand. Further, as shown in FIG. 18, each area has only the position of its left lower corner designated, and one window geometry No. is used to manage every area.

Besides, this method can be expanded into an expedient in which, even in the case of the tetragonal window shapes, only the window positions and the window geometry Nos. are managed in the window display area management file in FIG. 8, without managing the window size information. Wherein, when the window frames to be designated by the window geometry Nos. are set at or below the sizes which are to be designated by the size information items in FIG. 8, no obstacle is formed to the viewing of the monitoring frame.

Further, it is possible that, irrespective of the size and shape of the window area, a large frame as shown in each of FIGS. 3–5 is prepared as the window frame, whereupon only the part of the large frame which is seen through the window area is displayed and is scrolled, thereby rendering any desired part of the large frame displayable in the window area. Also in the case where any of the frames shown in FIG. 9, etc. has been selected as the window frame, scrolling can be utilized when the window frame protrudes from the window area. The utilization of scrolling diminishes the advantages of the elimination of troublesome operations and the advantage of all the necessary parts being received in the given window area which are achieved by the present invention. However, it is effective for limited uses because the window displaying method still maintains one of the features of the present invention, namely that the size and set position of the window area are selected so as not to be obstructive of the process monitoring.

While the preferred embodiment of the present invention has been described above, various modifications and alterations can be made without departing from the purport of the present invention. By way of example, the foregoing embodiment employs the coordinates of the left lower corner of a window area and the information of the size thereof for designating the position and size of the area, respectively, but coordinates for designating the position of the area are not restricted to those of the left lower corner. It is also possible to employ the coordinates of the diagonal positions of the display area instead of the coordinates of the left lower corner of the area and the information of the size thereof. In this case, the size of the area may be evaluated at the step 397 in FIG. 11.

According to the foregoing embodiment, a window can be displayed in accordance with a plant running state such as a run stage, without hampering run monitoring on a monitoring frame. Therefore, an operator need not perform such troublesome operations whereby the window is moved or is first erased and then redisplayed in order to see the information of a part hidden by the window display. Accordingly, the handling capability for the run monitoring is enhanced.

Besides, in a case where a run monitoring system having a plurality of CRTs for displaying frames in parallel is incapable of producing the parallel displays by the required number of CRTs on account of the breakdown or inspection of any of the CRTs, the run monitoring can be performed by displaying necessary information in one frame through the window display, without changing over frames frequently. Therefore, the reliability and maintainability of the system are enhanced.

Now, there will be described another embodiment of the present invention in which the image of a control device picked up by a television camera is displayed within a window.

Figure 22:
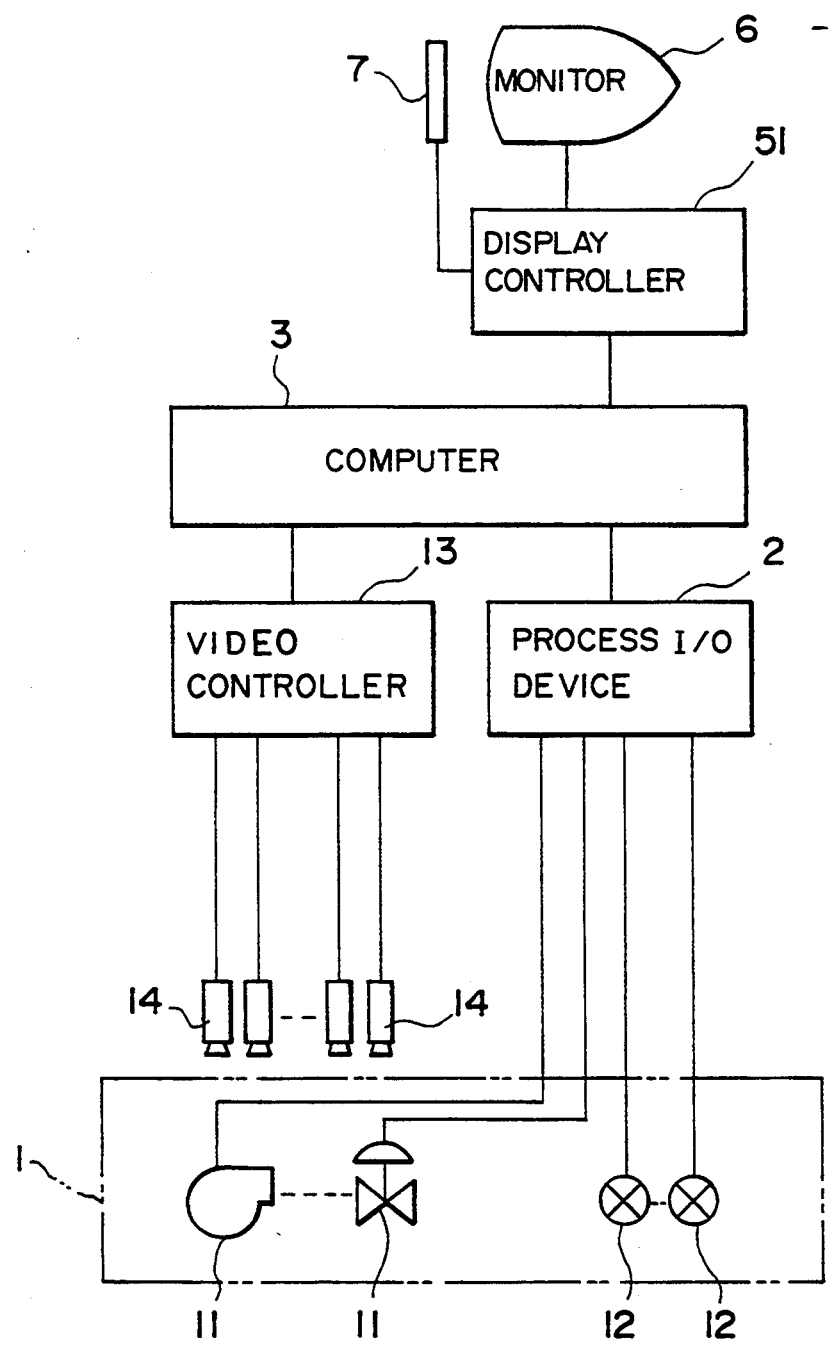
FIG. 22 is a schematic block diagram of a system architecture corresponding to the embodiment of FIG. 19.

FIG. 22 shows the whole architecture of a system using this embodiment. In the figure, the same constituents as in FIG. 1 have the same reference numerals assigned thereto. The system includes the process 1 of, for example, a power plant. The process 1 comprises control devices 11 such as pumps and valves, and sensors 12 for pressure, flow rate, temperature, electric conductivity, etc. Television cameras 14 are dispersedly installed on the site of the plant process. By way of example, the TV cameras 14 cover the control devices constituting the process within their fields of view, and they pick up the images of the operating states of the control devices and the states of the plant. The obtained images are subjected to digital processing by a video controller 13. A process I/O device 2 controls the input/output operations of control signals to the control devices 11 and process signals from the sensors 12. A computer 3 executes the controls of the control devices 11 based on the process signals, the construction of display picture frames based on monitoring image information from the video controller 13 and monitoring control information from the process I/O device 2, and so forth. Further, the system includes a display controller 51 which controls and activates the display frame, a monitor 6 which presents a display on the basis of display frame information, and a touch sensor 7 with which a touch input is given to an area allotted as a touch switch on the display frame.

Next, the operation of the embodiment of the present invention will be described in conjunction with the display frame of the embodiment shown in FIG. 19.

This figure illustrates the display frame for monitoring an AA run which is one of the subprocesses of the power plant. In an area [Monitoring/Operation Frame], there are displayed the system construction of the process comprised of the devices such as valves F001, F002, a pump E001 and a tank G001, and the information items of process variables, for example, the temperature (° C.) of the branch point of a pipe, the flow rate (Q) of a specified liquid and the pressure (P) of the tank. Besides, an image selection switch m1 and a device separate-operation selection switch n1 are displayed near the valve F001, a device separate-operation selection switch n2 is displayed near the valve F002, and image selection switches m2 and m3 are respectively displayed near the pump E001 and the tank G001. Also displayed are selection switches [Start] and [Stop] for a selected stage, [B] and [C] for the modes of run selection, [Automatic], [Manual], [Open] and [Close] for device operation selection, and [[Automatic] and [Manual] for image selection. On the other hand, an area [Device Image Frame] is a window which is opened in the monitoring/operation frame, and an image in which the valve F001 is principally viewed is displayed in the window area.

The image selection switches m1-m3, the device separate operation selection switches n1-n2 and the other selection switches mentioned above are displayed with such different display attributes that a selected state is exhibited in red, whereas an unselected state is exhibited in blue. In the illustration of FIG. 19, a hatched indication denotes the selected state. Accordingly, the image selection switches m1-m3 have the following three functions: The first is the function of an instruction pad for manually selecting the image. The second is the function of informing an operator of the device in correspondence with which the camera is disposed. The third is the function of informing the operator of the image which is presently selected and displayed.

Figure 19:
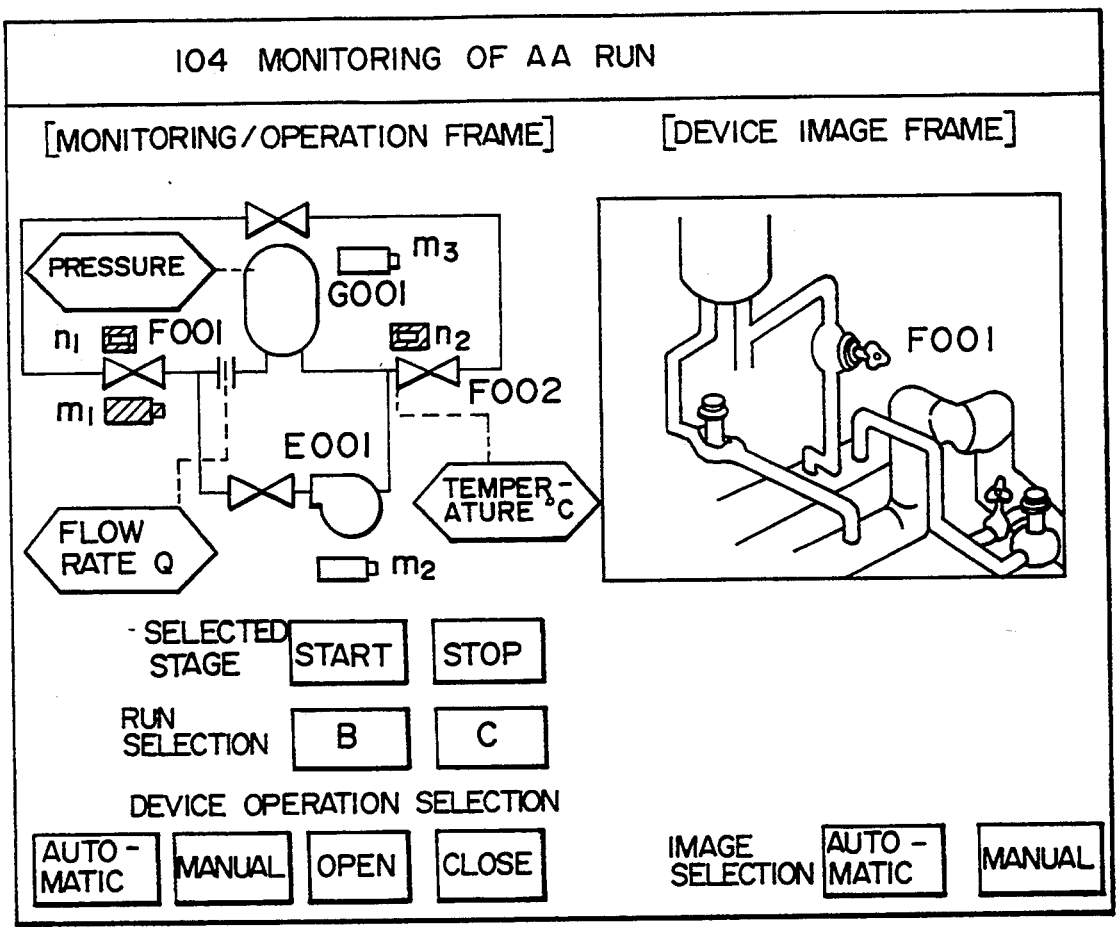
FIG. 19 is an explanatory diagram of a display frame in another embodiment of the present invention.

It should be noted that the process variables and the switches shown in FIG. 19 are exemplary and are not restrictive.

By way of example, in the monitoring/operation frame of the AA run at No. 104, the switches [Start] for the selected stage, [B] mode for the run selection and [Automatic] for the device operation selection are touched and operated using the touch sensor 7. Then, the control commands of the computer 3 are output to the control devices 11 through the process I/O device 2. Thus, the automatic run of the plant is started, and the control devices 11 such as pumps and valves of the process system construction as displayed on the frame are automatically actuated.

Besides, in a case where the device to be operated, for example, the valve F001 is "opened" or "closed" by a manual operation, the device-separate-operation selection switch n1 and the switch [Manual] for the device operation selection are touched and operated, followed by the touch operation of tile switch [Open] or [Close]. Then, a control command is output from the computer 3, and the valve F001 can be separately operated.

Here, in displaying the control device 11 (for example, the valve F001) which needs to be monitored in the AA run, the switch [Automatic] for the image selection is touched and operated. Then, the image information from the TV camera 14 is input to the computer 3 through the video controller 13, and the valve F001 is automatically displayed in the window area [Device Image Frame] of the monitor 6 via the window display processing of the display controller 51. Regarding manual operation, when the switch [Manual] for the image selection is depressed and any desired image selection switch is thereafter depressed, the image of the corresponding control device is displayed. By way of example, when the switch [Manual] for the image selection and the switch m1 are touched and operated, the valve F001 is displayed in the window area.

Next, the execution contents of the computer 3 concerning the management of the display frame will be described in association with FIG. 19. The memory of the computer 3 stores therein a monitoring/operation frame image management table shown in FIG. 20 by way of example. The table has image management information items and image attribute information items for the respective devices which are displayed on the screen of the monitor 6 in correspondence with each monitoring/operation frame. Here, "Monitoring/Operation Frame" information contains the No. of the frame and the designation of the plant system, while tile "Image Management" information contains the No. of the image management, the No. of the object device, the name of the object device and information on a display priority level. The display priority levels are bestowed on the respective devices every monitoring-/operation frame. In a case where one device has a plurality of image views, the priority levels are set in correspondence with the respective views. In addition, the "Image Attribute" information contains information on attributes forming the background of the display priority level, in correspondence with each image view. The display priority levels of the respective image views are determined on the basis of the image attribute information items either manually or automatically by a program.

By way of example, the valve F001 in the AA run monitoring of the monitoring/operation frame No. 104 has image management No. 'a' and display priority levels '1' and '3' corresponding respectively to image views X and Y. The display priority level '1' signifies that the image view X (for example, the upper side part of the valve F001) is "important for the run" as the image attribute and assumes a greater weight as compared with the image view Y (for example, the lower side part of the valve F001) merely "requiring monitoring". The display priority level '2' of the pump E001 at image management No. 'b' indicates that the image view X (for example, the body part of the pump E001) is "important for the run" and assumes a higher display priority level compared with the image view Y of the valve F001 merely "requiring monitoring". No display priority level is set for the image view Y (for example, the suction part of the pump E001) and the image view Z (for example, the discharge part of the pump E001) at the image management No. 'b'. Incidentally, although the plurality of image views for one device are attained here by disposing a plurality of cameras, they may well be attained by moving a single camera on rails.

Figure 21:
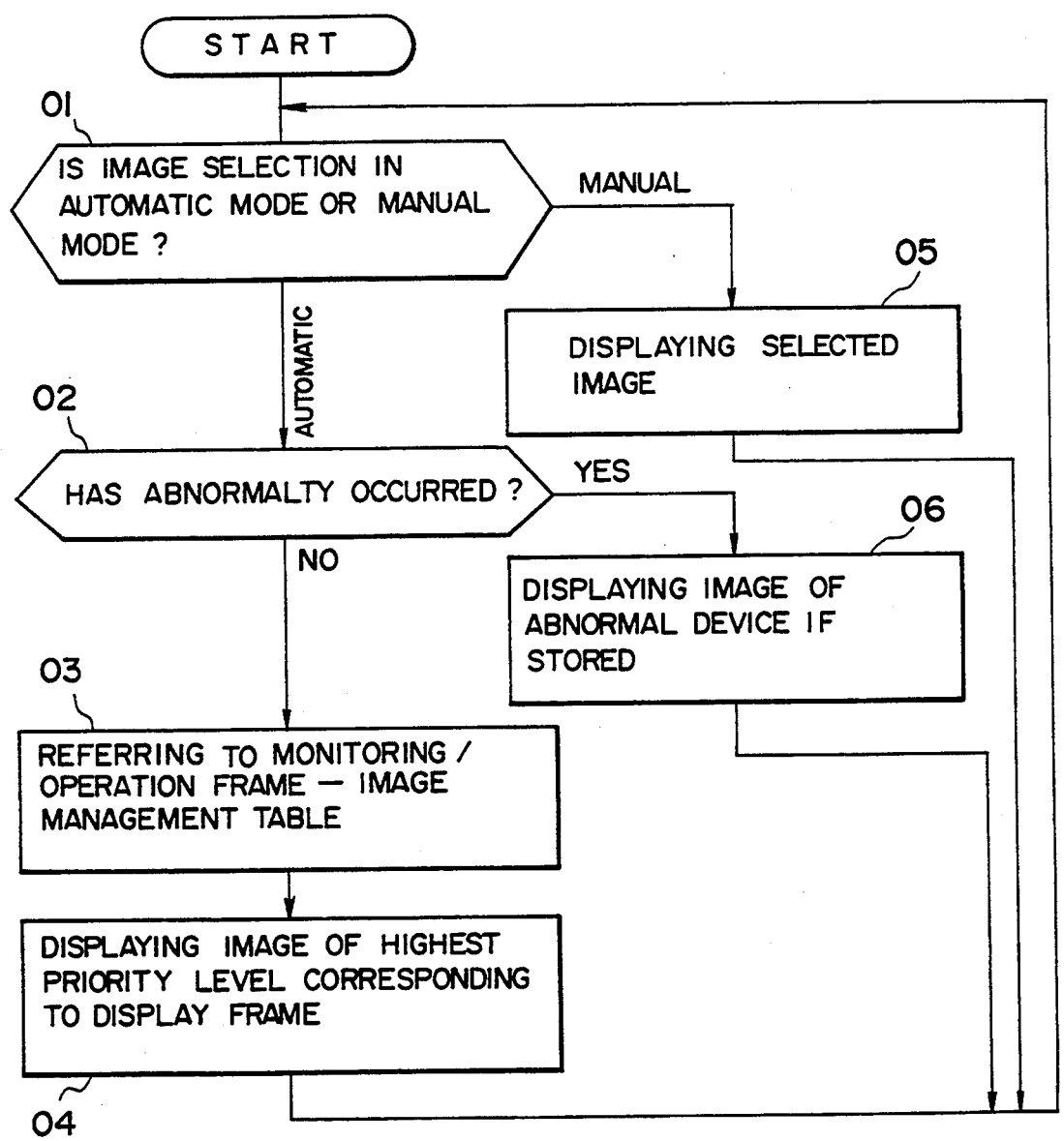
FIG. 21 is a flow chart of processing in the embodiment of FIG. 19.

Now, it is assumed that the AA run monitoring frame in FIG. 19 is manually or automatically displayed on the monitor 6 in accordance with the run state of the plant. On this occasion, a processing flow as shown in FIG. 21 is repeatedly executed in the computer 3.

<Step 01>

This step determines whether the image selection is in the automatic mode or in the manual mode.

<Step 02>

Usually, the image selection is in the automatic mode. This step detects whether or not any device has undergone an abnormality.

<Step 03>

In the absence of any device abnormality, the monitoring/operation frame image management table shown in FIG. 20 is referred to.

<Step 04>

The image whose priority level is the highest within the pertinent run monitoring frame is displayed in accordance with the display priority level information items set in the table. In a case where the image of the highest priority level cannot be displayed for reasons such as trouble of the camera, the image of the second highest priority level among the displayable images is displayed. The images having no priority levels are not displayed in the automatic mode.

<Step 05>

In a case where the image selection is in the manual mode, the image selected at will is displayed.

<Step 06>

In the presence of any device abnormality, the image of the corresponding device is displayed at a top priority.

Owing to the processing of the computer 3 as thus far described, when the switch [Automatic] for the image selection is selected in the display frame shown in FIG. 19, the image of the valve F001 is preferentially selected by the video controller 13 from among the images of the TV cameras 14 corresponding to the devices of each process. After being digitally processed, this image is displayed on the monitor 6 by the window processing of the display controller 51. Further, when any device has become abnormal, the image thereof is automatically selected and is displayed in the window area with the display priority levels ignored. On the other hand, when the switch [Manual] for the image selection is selected, the device is selected in accordance with the operation of any of the image selection switches m1-m3, and the image thereof is displayed in the window area.

Incidentally, the selection of an image not based on the management table in FIG. 20 is also possible in the state in which the switch [Automatic] for the image selection is selected. By way of example, the image of the device presently under operation may well be automatically selected without regard to the automatic/manual modes for the device operation selection.

Besides, regarding the relationship between the monitoring/operating frame information and the image management information, the use of artificial intelligence technology, fuzzy computer technology or neuro-computer technology realizes minute conditions and correspondence, the addition of a learning function, and so forth.

Now, still another embodiment of the present invention will be described.

Figure 23:
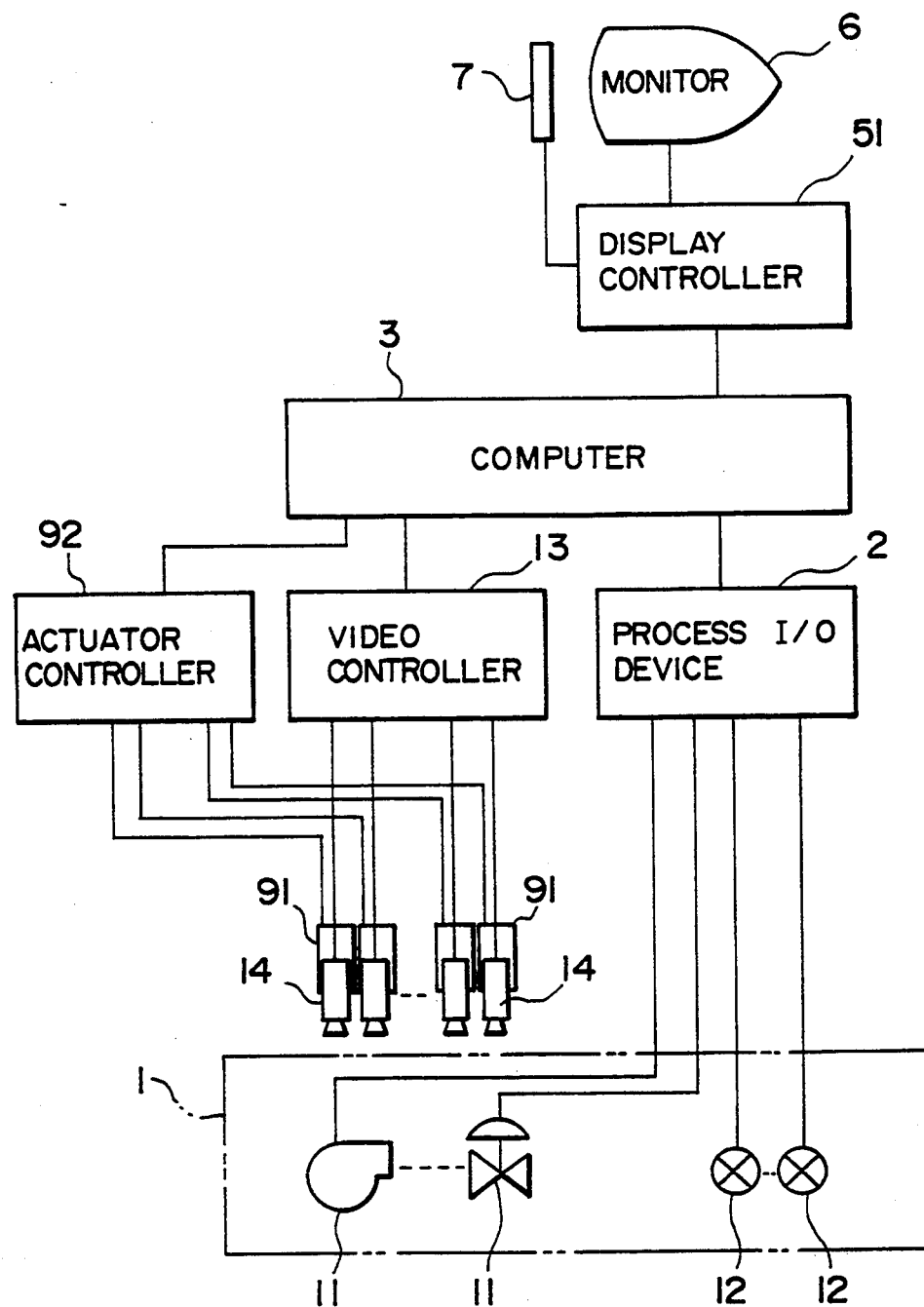
FIG. 23 is a schematic block diagram of a system architecture in still another embodiment of the present invention.

The architecture of a system utilizing this embodiment is as shown in FIG. 23. This system is so constructed that the system in FIG. 22 is additionally equipped with TV camera actuators 91 for controlling the image directions and the fields of view of the TV cameras 14, and an actuator controller 92 for controlling the TV camera actuators 91.

The TV camera actuators 91 control the image directions and views of the TV cameras 14 in accordance with control signals which are output from the TV camera actuator controller 92 on the basis of commands from the computer 3.

Figure 24:
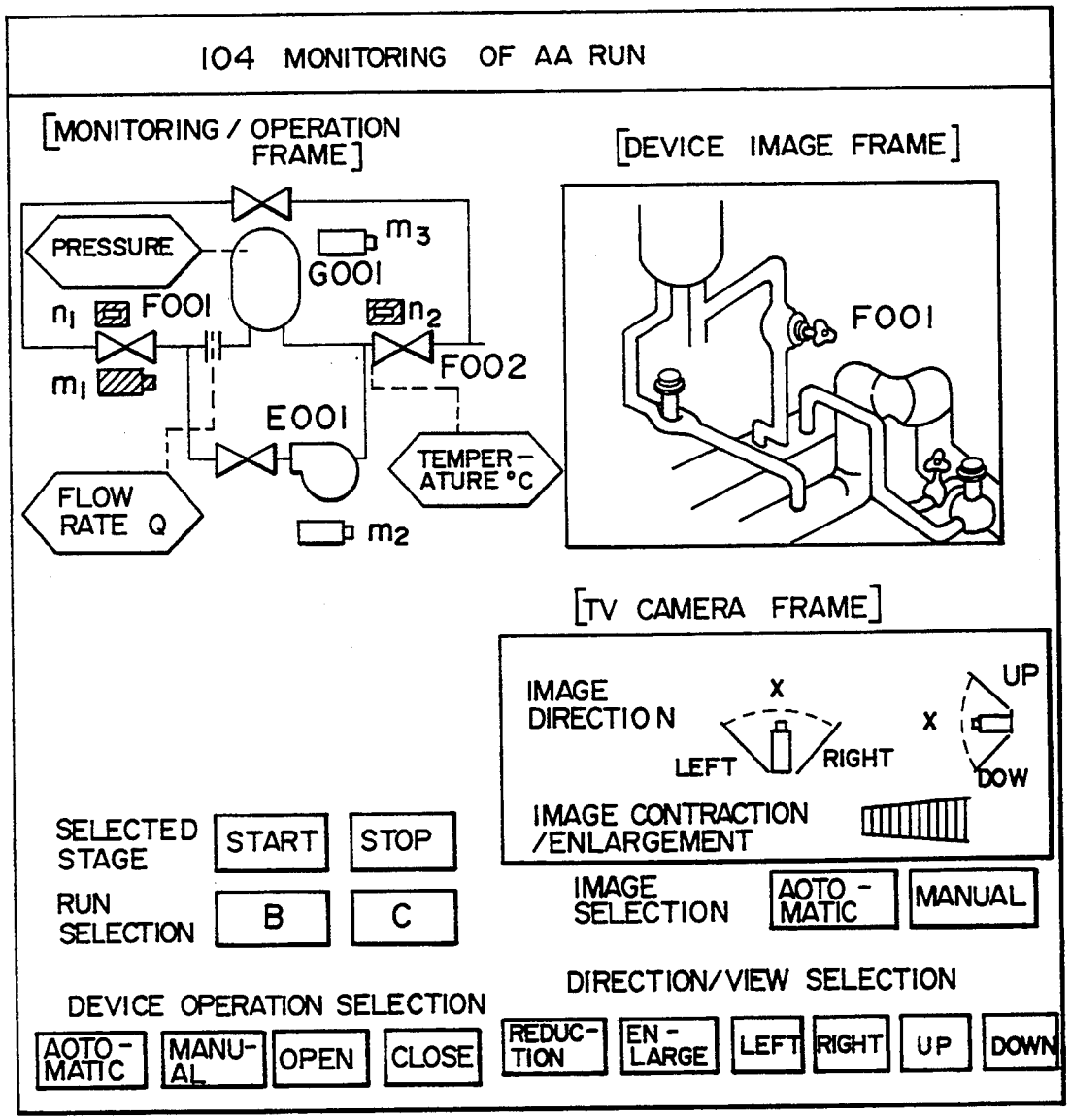
FIG. 24 is an explanatory diagram of a display frame in the embodiment of FIG. 23.

In this case, as exemplified in FIG. 24, a display picture frame is additionally formed with a frame [TV camera frame] which includes a window display configured of "Left/Right" and "Up/Down" concerning the image direction and "Reduction/Enlarge" concerning the view, and the indications of selection switches [Left], [Right], [Up], [Down], [Reduction] and [Enlarge] concerning the selections of the direction and view. On the display frame, the operator of the system depresses the selection switch, for example, [Right] concerning the image direction by the use of the touch sensor 7. Then, a signal is received by the computer 3 through the touch sensor 7, the control signal is output from the TV camera actuator controller 92, and the TV camera actuator 91 moves the direction of the TV camera rightwards. This operation is associated with the monitor 6 as to the image direction such that a graphic pattern representative of the direction is displayed in the window of the display frame.

Likewise, when the selection switch, for example, [Enlarge] is touched, the television camera 14 is zoomed up, and the situation is displayed in the window of the display frame as a graphic pattern which lengthens or shortens in the form of a bar graph by way of example.

In generating such a display frame, it is readily realizable to set the frame [Monitoring/Operation Frame] as a basic frame, in which the frames [Device Image Frames] of a plurality of devices and the frames [TV Camera Frames] indicating the image directions and views of a plurality of TV cameras are respectively displayed within a plurality of windows. Also, it is easy to set one or more frames [Device Image Frames] and one or more frames [TV Camera Frames] as a based frame, in which one or more frames [Monitoring/Operation Frames] are displayed within one or more windows.

Although this embodiment has been described by taking the monitoring and control system of the plant as an example, the present invention is readily applicable to a system in which television cameras are mounted on a movable structure and which monitors the states of devices as a robot. The embodiment in FIG. 1 and the embodiment in FIG. 19 can be realized independently of each other, but they can also be implemented in combination.

According to the embodiment illustrated in FIGS. 19 through 24, switches capable of being used as touch inputs, such as for a selected stage, run mode selection, device operation selection, image selection and device separate-operation selection, are displayed in correspondence with the frame of a process system construction selected and displayed automatically or manually, in a frame [Monitoring/Operation Frame], and operation inputs are given to a computer through the touch operations of the switches so as to select and operate various control devices, while a frame [Device Image Frame] is combined and displayed simultaneously with the frame [Monitoring/Operation Frame]. Therefore, an operator can monitor and operate the control devices easily and reliably while watching a display frame, and monitoring and handling capabilities for the operator are remarkably enhanced.

In addition, when the automatic operation switch for the image selection has been selected, the optimum image information to be displayed is selected from among the image information items of a plurality of object devices, or when any of a plurality of object devices has undergone an abnormality, the image information of the abnormal device is displayed in the frame [Device Image Frame] at a top priority. Therefore, the operation of selecting the image of a control device to be monitored from among a plurality of control devices, in correspondence with a run state, is dispensed with, and the operator's tasks for the monitoring and operations can be remarkably reduced.

Besides, in the frame [Monitoring/Operation Frame] presently under selection and display, the directions of imaging and the fields of view of television cameras are operated and controlled relative to control devices constituting tile process. Therefore, an imaging range per television camera widens, with the result that the utilization efficiency of each television camera is enhanced or that the number of the television cameras which need to be installed can be sharply reduced.

Further, a selected control device and the imaging direction and view of a television camera corresponding to the control device are displayed in windows. Therefore, the operator is permitted to operate and control the television camera while directly reviewing a frame [TV Camera Frame] as to the relationship between the control device displayed in the frame [Device Image Frame] and the imaging direction/view of the television camera corresponding to the control device, and the display frame operations are facilitated, expediated and ensured much more.

What is claimed is:

1. A window displaying method for a display device included in a process monitoring system for a plant, comprising the steps of:
   preparing a plurality of process monitoring display frames to be displayed on the display device, and preparing a plurality of window frames to be displayed in windows which are opened in the process monitoring display frames;
   preregistering in a memory, for at least one display frame of said plurality of process monitoring display frames, a first window area for display of a window at a position of relatively low importance with respect to information content of said display frame under a first process condition and a second window area for display of a window at a different position of relatively low importance with respect to information content of said display frame under a second process condition; and
   displaying a selected one of the window frames in a selected window area selected on a basis of an existing process condition and corresponding to one of said first window area and said second window area upon a request for a window display within said display frame.

2. A window displaying method as defined in claim 1, wherein said first window area and said second window area are registered individually for respective different run states of said plant, with respect to identical display frames.

3. A window displaying method as defined in claim 1, wherein a plurality of window frames which differ in at least either size or shape are prepared for one window frame of substantially identical content, and the largest window frame which can be received in a selected window area is selected from among said plurality of window frames.

4. A window displaying method as defined in claim 3, wherein said plurality of window frames contain the same display items, and arrangements of said display items are made different in accordance with the shapes of said window frames.

5. A window displaying method as defined in claim 3, wherein the smallest window frame is automatically selected on condition that none of said plurality of window frames can be received in said selected window area.

6. A window display method as defined in claim 1, wherein a size of the window frame is changed in accordance with a size of said selected window area, and the window frame of the changed size is displayed in said selected window area.

7. A window displaying method as defined in claim 1, wherein for a window frame larger than said selected window area, only that part of said window frame which corresponds to the size of said selected window area is displayed in said selected window area, and said window frame in said selected window area is allowed to scroll.

8. A window displaying method as defined in claim 1, wherein a shape of said selected window area is a polygon having at least five sides.

9. A window displaying method as defined in claim 8, wherein a window frame whose shape conforms to the polygonal shape is prepared.

10. A window displaying method as defined in claim 1, wherein in the presence of a plurality of window areas within one display frame, a sequence in which said plurality of window areas are used is determined beforehand.

11. A window displaying method as defined in claim 10, wherein the window frame to be automatically erased is determined on the basis of a time period for which the window frame continues to be displayed.

12. A window displaying method as defined in claim 1, wherein in the presence of a plurality of window areas within one display frame, when a new request for the window frame display has been made on condition that all said window areas are used, any of the window frames now displayed is automatically erased.

13. A window displaying method as defined in claim 12, wherein the window frame to be automatically erased is one displayed in a predetermined specific window area.

14. A window displaying method as defined in claim 12, wherein the window frame to be automatically erased is determined on the basis of an areal extent of the window frame or the window area in which said window frame is displayed.

15. A window displaying method as defined in claim 1, wherein each of the process monitoring display frames is a monitoring/operation frame in which a plurality of control devices for a process of said plant are displayed by symbols, and each of the window frames is an image frame which is picked up by any of a plurality of television cameras disposed in correspondence with said plurality of control devices.

16. A window displaying method as defined in claim 15, wherein on said monitoring/operation frame, symbols expressive of said television cameras are respectively displayed near said symbols of said control devices corresponding to said television cameras.

17. A window displaying method as defined in claim 16, wherein said symbols expressive of said television cameras are permitted to be designated on said display frame through touch inputs, and the image frame to be displayed in said window is selected by designating the corresponding symbol.

18. A window displaying method as defined in claim 17, wherein an automatic mode and a manual mode are provided as image frame selection modes for displaying said image frame of any of said plurality of television cameras in said window, and in said automatic mode, the image frame of preset high priority level is automatically selected for said each process monitoring/operation frame, while in said manual mode, the desired image frame is selected by designating said symbol expressive of said television camera.

19. A window displaying method as defined in claim 16, wherein a display attribute of the symbol for the television camera which corresponds to the image frame presently under display in said window is changed.

20. A window displaying method for a display device included in a process monitoring system for a plant, comprising the steps of;

preparing a plurality of run monitoring frames to be displayed on said display device, and preparing a plurality of window frames to be displayed in windows which are opened in the run monitoring frames;

selecting display areas of comparatively low importance at individual run stages, for the respective run monitoring frames beforehand;

preregistering in a memory, for at least one display frame of said plurality of run monitoring frames, a first window area for display of a window at a position of relatively low importance with respect to information content of said display frame under a first run condition and a second window area for display of a window at a different position of relatively low importance with respect to information content of said display frame under a second run condition; and displaying a selected one of the window frames in a selected window area selected on a basis of an existing run condition and corresponding to one of said first window area and said second window area upon a request for a window display within said display frame.

21. A window displaying method for a display device included in a process monitoring system for a plant, comprising the steps of:

preparing a plurality of process monitoring display frames to be displayed on the display device, and preparing a plurality of window frames to be displayed on windows which are opened in the process monitoring display frames;

preregistering in a memory, for at least one display frame of said plurality of process monitoring display frames, a first window area of a first predetermined size or shape for display of a window at a position of relatively low importance with respect to information content of said display frame under a first process condition and a second window area of a second predetermined size or shape for display of a window at a different position of relatively low importance with respect to information content of said display frame under a second process condition, wherein a plurality of frames which differ in at least either of size or shape are prepared as the window frames of substantially identical content; and displaying a selected one of the window frames in one of said first and second predetermined size or shape in a selected window area selected on a basis of an existing process condition and corresponding to one of said first window area and said second window area upon a request for a window display within said display frame.

22. A process monitoring system for monitoring run states of a plant, comprising:

a process input unit which receives process information from said plant;

a display device capable of window display, which displays a process monitoring frame on the basis of the process information obtained from said process input unit;

window area management means for managing information items of window areas so as to set a window area for the respective process monitoring frames, said window area management means having preregistered in a memory, for at least one display frame of said plurality of process monitoring frames, at least a first window area for display of a window at a position of relatively low importance with respect to information content of said display frame under a first run condition and a second window area for display of a window at a different position of relatively low importance with respect to information content of said display frame under a second run condition;

window frame data storage means for storing display data items of a plurality of sorts of window frames;

window display frame management means for managing information items each specifying the monitoring frame presently under display;

an input device through which a request for displaying in one of said window frames is made; and window display control means responsive to the window display request through said input device, for acknowledging said monitoring frame presently under display with said window display frame management means, for receiving information concerning a selected window area selected on a basis of an existing process condition and corresponding to one of said first window area and said second window area with said window area management means, and for fetching the display data of the specified window frame from said window frame data storage means and then displaying the fetched display data in said window area.

23. A process monitoring system as defined in claim 22, wherein said window area management means manages the window areas individually for respective run stages of said plant, as to an identical monitoring frame, and said window display frame management means manages information items each specifying the present run stage, together with the information items each specifying the monitoring frame presently under display.

24. A process monitoring system as defined in claim 22, wherein said window frame data storage means stores a plurality of window frames which differ in at least either size or shape, as the window frames of the identical sort, and said selected window display control means selects the largest window frame which is receivable in said window area.

25. A process monitoring system as defined in claim 24, wherein said plurality of window frames contain the same display items, and arrangements of said display items are made different in accordance with the shapes of said window frames.

26. A process monitoring system as defined in claim 22, wherein said window display control means changes a sight of the window frame in accordance with a size of said selected window area and displays the window frame of the changed size in said selected window area.

27. A process monitoring system as defined in claim 22, wherein the window frame has a shape other than a tetragon.

28. A process monitoring system as defined in claim 22, wherein said window area management means stores the coordinate information items of the window areas whose shape is a polygon having at least five sides.

29. A process monitoring system as defined in claim 28, wherein said window frame data storage means stores the display data items of the window frames whose shape conforms to the polygonal shape.

30. A process monitoring system as defined in claim 22, wherein said window area management means manages information items of said first window area and said second window area set for said at least one display frame, and said window display frame management means manages the information items each specifying the monitoring frame presently under display and information items respectively specifying the window frames under display in said plurality of window areas.

31. A process monitoring system for monitoring run states of a plant, comprising:

a process input unit which receives process information from said plant;

frame data storage means for storing display data items of a plurality of sorts of frames;

a display device capable of window display, which displays a frame on the basis of the process information obtained from said process input unit;

window area management means for managing information items of window areas so as to set a window area for the respective frames, said window area management means having preregistered in a memory, for at least one display frame of said plurality of process monitoring frames, at least a first window area for display of a window at a position of relatively low importance with respect to information content of said display frame under a first run condition and a second window area for display of a window at a different position of relatively low importance with respect to information content of said display frame under a second run condition;

window display frame management means for managing information items each specifying the frame presently under display;

an input device through which a request for displaying a one of said frames is made; and window display control means responsive to the window display request through said input device, for acknowledging said frame presently under display with said window display frame management means, for receiving information concerning a selected window area selected on a basis of an existing process condition and corresponding to one of said first window area and said second window area with said window area management means, and for movably displaying part of the specified frame in said window area.

32. A process monitoring system for monitoring run states of a plant, comprising:

a process input unit which receives process information from said plant;

a display device capable of window display, which displays a process monitoring frame on the basis of the process information obtained from said process input unit;

window area management means for managing position information items of window areas set for the respective process monitoring frames, said window area management means having preregistered in a memory, for at least one display frame of a plurality of process monitoring frames, at least a first window area for display of a window at a position of relatively low importance with respect to information content of said display frame under a first run condition and a second window area for display of a window at a different position of relatively low importance with respect to information content of said display frame under a second run condition, and form information items of window frames displayable in said window areas;

window frame data storage means for storing display data items of a plurality of sorts of window frames;

window display frame management means for managing information items each specifying the monitoring frame presently under display so as to set a window area for the respective frames beforehand at a position of relatively low importance for display of information in the particular process monitoring display frame;

an input device through which a request for displaying one of said window frames is made; and window display control means responsive to the display request through said input device, for acknowledging said monitoring frame presently under display with said window display frame management means, for receiving information concerning the position information of the window area set for said monitoring frame and the form information of the window frame with said window display frame management means, and for fetching the display data of said window frame conforming to said form information from said window frame data storage means, as to said window frame designated through said input device, and then displaying the fetched display data in the position designated by said position information of said window area.

33. A window displaying method for a display device included in a process monitoring system for a plant, comprising the steps of:

disposing a plurality of television cameras in correspondence with a plurality of devices for a process:

displaying a process monitoring/operation frame in which said plurality of devices are expressed by their symbols, on said display device, together with those symbols expressive of said plurality of television cameras which are respectively displayed near said symbols of said devices corresponding to said television cameras;

preregistering in a memory, for said process monitoring/operation frame, a first window area for display of a window at a position of relatively low importance with respect to information content of said display frame under a first process condition and a second window area for display of a window at a different position of relatively low importance with respect to information content of said display frame under a second process condition;

opening a selected window selected on a basis of an existing process condition and corresponding to one of said first window area and said second window area in said process monitoring/operation frame; and displaying an image picked up by any of said plurality of television cameras in said selected window.

34. A window displaying method as defined in claim 33, wherein said symbols expressive of said television cameras are permitted to be designated on the display frame through touch inputs, and the image frame to be displayed in said selected window is selected by designating the symbol.

35. A window displaying method as defined in claim 34, wherein an automatic mode and a manual mode are provided as image frame selection modes for displaying the image frame of any of said plurality of television cameras in said window, and in said automatic mode, the image frame of preset high priority level is automatically selected for said process monitoring/operation frame, while in said manual mode, the desired image frame is selected by designating said symbol expressive of said television camera.

36. A window displaying method as defined in claim 35, wherein when any of said devices has become abnormal in said automatic mode, the image frame of the abnormal device is automatically selected.

37. A window displaying method as defined in claim 35, wherein switches permitting the touch inputs, which designate said automatic mode and said manual mode of said image frame selection modes are displayed in said display frame.

38. A window displaying method as defined in claim 33, wherein a display attribute of the symbol for the television camera which corresponds to the image frame presently under display in said selected window is changed.

39. A window displaying method as defined in claim 33, wherein a frame for operating the selected television camera, which contains an imaging direction and an imaging view of said television camera, is displayed in said selected window opened in said process monitoring/operation frame, and switches permitting touch inputs, which serve to operate said direction and said view, are displayed in the display frame.

* * * * *